US006991077B2

(12) United States Patent
Maeno et al.

(10) Patent No.: US 6,991,077 B2
(45) Date of Patent: *Jan. 31, 2006

(54) VIBRATION DAMPING DEVICE

(75) Inventors: Hajime Maeno, Kasugai (JP);
Katsuhiko Katagiri, Ichinomiya (JP)

(73) Assignee: Tokai Rubber Industries, Ltd.,
Aichi-Ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/256,874

(22) Filed: Sep. 26, 2002

(65) Prior Publication Data

US 2003/0062230 A1  Apr. 3, 2003

(30) Foreign Application Priority Data

Sep. 28, 2001  (JP) .............................. 2001-299062

(51) Int. Cl.
*F16F 7/10* (2006.01)
(52) U.S. Cl. ...................... 188/380; 188/378; 188/379; 267/136; 267/141; 267/292
(58) Field of Classification Search ................ 188/379, 188/380; 267/292, 141, 136; 248/560, 632, 248/634
See application file for complete search history.

(56) References Cited

U.S. PATENT DOCUMENTS

| | | | |
|---|---|---|---|
| 1,737,048 A * | 11/1929 | Hunt ............................ 280/89 |
| 2,714,161 A | 7/1955 | Featherstun |
| 3,612,222 A | 10/1971 | Minor |
| 4,522,279 A * | 6/1985 | Kanazawa .................. 180/421 |
| 4,706,788 A | 11/1987 | Inman et al. |
| 5,326,324 A | 7/1994 | Hamada |
| 5,671,909 A | 9/1997 | Hamada et al. |
| 5,887,843 A * | 3/1999 | Hidekawa et al. ........... 248/559 |
| 6,050,554 A * | 4/2000 | Tournier ................. 267/140.11 |
| 6,354,575 B1 * | 3/2002 | Yamashita ................... 267/136 |
| 6,439,359 B1 | 8/2002 | Kato et al. |
| 6,722,481 B2 * | 4/2004 | Maeno et al. ................ 188/379 |
| 2001/0020761 A1 | 9/2001 | Hasegawa |
| 2001/0022256 A1 | 9/2001 | Misaji et al. |

(Continued)

FOREIGN PATENT DOCUMENTS

JP            55-2764        6/1953

(Continued)

OTHER PUBLICATIONS

U.S. Appl. No. 10/102,050, filed on Mar. 19, 2002.

(Continued)

*Primary Examiner*—Thomas Williams
*Assistant Examiner*—Mariano Sy
(74) *Attorney, Agent, or Firm*—Beyer Weaver & Thomas LLP

(57) ABSTRACT

A vibration-damping device includes: a damper mass having a housing member with an accommodation space, an independent mass member housed within the accommodation space with a slight spacing therebetween so that the independent mass member is independent of the housing member and is freely displaceable within the accommodation space of the housing member to come into impact on the housing member via an elastic member; and a metallic spring member to be fixed at a plurality of fixing portions thereof on the vibrative member for elastically supporting the damping mass vibrative member, such that the housing member of the damper mass is fixed to a portion of the metallic spring member through which a principal elastic axis of the metallic spring member extends, and that a center of gravity of the damper mass is located on the principal elastic axis of the metallic spring member.

16 Claims, 12 Drawing Sheets

U.S. PATENT DOCUMENTS

| | | | |
|---|---|---|---|
| 2001/0026039 A1 | 10/2001 | Hasegawa et al. | |
| 2001/0032764 A1 | 10/2001 | Hasegawa et al. | |
| 2002/0030315 A1 | 3/2002 | Kato et al. | |
| 2003/0057623 A1 * | 3/2003 | Maeno et al. | |

FOREIGN PATENT DOCUMENTS

| | | |
|---|---|---|
| JP | 57-52305 | 3/1982 |
| JP | 58-136636 | 9/1983 |
| JP | 62-49038 | 3/1987 |
| JP | 64-42591 | 3/1989 |
| JP | 2-11635 | 3/1990 |
| JP | B2-125878 | 5/1990 |
| JP | 02-221731 | 9/1990 |
| JP | 3-11150 | 2/1991 |
| JP | 3-86227 | 8/1991 |
| JP | 4-46246 | 4/1992 |
| JP | 05-078789 | 3/1993 |
| JP | 06-117485 | 4/1994 |
| JP | 08-122103 | 5/1996 |
| JP | 08-145117 | 6/1996 |
| JP | 9-329182 | 12/1997 |
| JP | 11-141600 | 5/1999 |
| JP | 11-233039 | 8/1999 |
| JP | 2000-283216 | 10/2000 |

OTHER PUBLICATIONS

U.S. Appl. No. 10/076,781 filed on Feb. 13, 2002.

* cited by examiner

VIBRATION DAMPING DEVICE

INCORPORATED BY REFERENCE

The disclosure of Japanese Patent Application No. 2001-299062 filed on Sep. 28, 2001 including the specification, drawings and abstract is incorporated herein by reference in its entirety.

BACKGROUND OF THE INVENTION

1. Field of the Invention

The present invention generally relates to a vibration-damping device adapted to be mounted on a vibrative member so as to function as a secondary vibration system with respect to the vibrative member as a primary vibration system, for thereby damping vibrations excited in the vibrative member. More specifically, the present invention is concerned with such a vibration-damping device that is novel in construction and that is capable of exhibiting an excellent damping effect with respect to vibrations over a relatively wide frequency range.

2. Description of the Related Art

A dynamic damper is widely known as one type of vibration-damping devices for damping vibrations excited in a vibrative member, such as a body of an automotive vehicle. The known dynamic damper includes a mass and a spring system, and is mounted on the vibrative member for providing a secondary vibration system with respect to the vibrative member as a primary vibration system.

However, the known dynamic damper is not able to exhibit a desired damping effect with respect to vibrations over a wide frequency range, since a damping effect of the known dynamic damper is limited to a relatively narrow frequency range to which a natural frequency of the secondary vibration system is tuned.

Moreover, the known vibration-damping device causes undesirable increase of transmissibility at two frequency ranges located upper and lower sides of the frequency range to which the natural frequency of the secondary vibration system is tuned, inevitably suffering from deterioration of a vibration condition of the vibrative member.

This conventional problem experienced in the known dynamic damper, namely, undesirable increase of the transmissibility at the lower and higher frequency range of the tuning frequency of the secondary vibration system, may be eliminated or minimized by giving a sufficiently high damping effect to the spring system of the dynamic damper. In view of the above, it is proposed to make the spring system out of a rubber elastic body having a high damping capability. In this case, however, the damping characteristics of the spring system formed by the rubber elastic body is likely to be influenced by the ambient temperature. Therefore, the known dynamic damper may suffer from difficulty in exhibiting a desired damping effect with high stability due to a considerable change of the ambient temperature, depending upon a portion where the dynamic damper is installed.

SUMMARY OF THE INVENTION

It is therefore one object of the invention to provide a novel vibration-damping device, which is capable of exhibiting an excellent damping effect for a wide frequency range of input vibrations, and which ensures a desired damping effect with high stability, while minimizing a temperature dependency of its damping effect.

The above and/or optional objects of this invention may be attained according to at least one of the following modes of the invention. Each of these modes of the invention is numbered like the appended claims and depending from the other mode or modes, where appropriate, to indicate possible combinations of elements or technical features of the invention. It is to be understood that the principle of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

(1) A vibration-damping device for damping vibrations excited in a vibrative member, comprising: (a) a damper mass including a housing member defining an accommodation space therein, an independent mass member housed within the accommodation space of the housing member with a slight spacing therebetween so that the independent mass member is independent of the housing member and is freely displaceable within the accommodation space of the housing member to come into impact on the housing member via an elastic member; and (b) a metallic spring member adapted to be fixed at a plurality of fixing portions thereof on the vibrative member for elastically supporting the damper mass on the vibrative member, such that the housing member of the damper mass is fixed to a portion of the metallic spring member through which a principal elastic axis of the metallic spring member extends, and that a center of gravity of the damper mass is located approximately on the principal elastic axis of the metallic spring member.

According to this mode of the invention, when the vibration-damping device is subjected to vibrations excited in the vibrative member, the damper mass is oscillated or displaced as a result of elastic deformation of the metallic spring member, thus causing displacement of the independent mass member relative to the housing member. In particular, the damper mass and the metallic spring member function as a mass component and a spring component of a secondary vibration system with respect to the vibrative member as a primary spring system. Therefore, when the vibration-damping device is subjected to vibrations whose frequency range is approximately equal to a natural frequency of the secondary vibration system, the displacement of the damper mass is made larger. As a result, the displacement of the independent mass member relative to the housing member is also made larger, so that the independent mass member efficiently comes into impact on the housing member, directly and elastically. Thus, the present vibration-damping device is able to exhibit an amplitude or vibration attenuating effect with respect to the vibrative member, on the basis of the impact of the independent mass member on the housing member. That is, the impact of the independent mass member on the housing member functions to increase an apparent loss factor of the secondary vibration system constituted by the damper mass and the spring member.

This advantageous feature of the present invention makes it possible not only to employ the metallic spring member having a low loss factor, as the spring member of the secondary vibration system, but also to restrict or attenuate a peak value or undesirable increase of transmissibility at two frequency ranges located upper and lower sides of the frequency range to which the natural frequency of the secondary vibration system is tuned. Therefore, the vibration-damping device of the present invention is capable of exhibiting an excellent damping effect with respect to vibrations over a wide frequency range.

Furthermore, the vibration-damping device of this mode of the invention uses the metallic spring member that has a specific structure to be fixed at the plurality of fixing portions on the vibrative member, while the damper mass is supported by the metallic spring member with its center of gravity located approximately on the principal elastic axis of the metallic spring member. This arrangement ensures the damper mass to be oscillated or displaced in a direction of straight line which is approximately aligned to a vibration input direction, when vibrations to be damped are applied to the vibration-damping device in the vibration input direction. As a result, the direction of displacement of the independent mass member relative to the housing member is considerably stabilized, and the independent mass member is brought into impact on the housing member with stable condition, e.g., with a stable position relative to the housing member, whereby the vibration-damping device can exhibit the above-indicated excellent damping effect based on the impact of the independent mass member on the housing member in a further stabilized and effective manner.

It should be appreciated that the vibration-damping device of the present mode of the invention includes no member functioning to directly connect the independent mass member and the housing member with each other. Namely, an entire outer peripheral surface of the independent mass member is completely independent of the housing member. With the independent mass member placed on a center of its travel relative to the housing member, the entire outer peripheral surface of the independent mass member is entirely spaced away from the housing member. Hence, the independent mass member is displaceable relative to the housing member without being adhesive to any part of the housing member.

(2) A vibration-damping device according to the above-indicated mode (1), wherein an entire center of gravity of the independent mass member is located on the principal elastic axis of the metallic spring member. According to this mode of the invention, a resultant force acting on the housing member due to the impact of the independent mass member on the housing member, is applied to the metallic spring member in a direction approximately aligned to the principal elastic axis of the metallic spring member. This arrangement permits a stable elastic deformation of the metallic spring member and a stable displacement of the damper mass. Thus, the vibration-damping device can exhibit the above-indicated excellent damping effect based on the impact of the independent mass member on the housing member in a further stable and efficient manner.

(3) A vibration-damping device according to the above-indicated mode (1) or (2), wherein the independent mass member comprises a pillar shaped mass disposed within the accommodation space such that a central axis of the pillar shaped mass extends approximately parallel to the principal elastic axis of the metallic spring member, and at least one of axially opposite end portions of the pillar shaped mass comes into impact on the housing member. In this arrangement, the independent mass member can effectively obtain a sufficient weight or mass in a direction of the principal elastic axis of the metallic spring member in which the independent mass member primarily comes into impact on the housing member, making it possible to further improve stability of displacement of the independent mass member relative to the housing member. To further stabilize the displacement of the pillar shaped mass within the housing member, the accommodation space may be shaped to have a cylindrical profile whose size is made some-what larger than the profile of the pillar shaped mass. This cylindrical accommodation space extends in a direction parallel to the principal elastic axis of the metallic spring member, so as to guide an outer circumferential surface of the pillar shaped mass in the axial direction.

(4) A vibration-damping device according to any one of the above-indicated modes (1)–(3), wherein the elastic member comprises a shear type rubber elastic body that is subjected to shear deformation when the independent mass member comes into impact on the housing member via the shear type rubber elastic body. The use of the shear type rubber elastic body makes it possible to sufficiently reduce a spring constant at an abutting portion in which the independent mass member and the housing member are brought into abutting contact with each other, without needing an increase of a wall thickness of the elastic member or a change of a material for forming the elastic member, in comparison with the case where the elastic member comprises a compression type rubber elastic body that is subjected to compression deformation when the independent mass member comes into impact on the housing member via the compression type rubber elastic body. Therefore, the vibration-damping device is capable of efficiently exciting jumpily or bouncing displacement of the independent mass member relative to the housing member, even upon application of vibrations having a small energy to the vibration-damping device, and accordingly exhibiting an excellent vibration damping effect based on impact of the independent mass member on the housing member, while avoiding enlargement of the elastic member to have a large wall thickness, and deterioration of a durability of the elastic member due to the change of the material.

(5) A vibration-damping device according to any one of the above-indicated modes (1)–(4), wherein the metallic spring member comprises a gate-shaped leaf spring made out of a leaf spring by bending longitudinally opposite end portions of the leaf spring to form a pair of leg portions integrally formed at longitudinally opposite ends of a top plate portion interposed therebetween, and the gate-shaped leaf spring is adapted to be fixed on the vibrative member at distal end portions of the pair of leg portions, and supports the damper mass whose housing member is fixed to an approximately central portion of the top plate portion. This mode of the invention provides the vibration-damping device that can be easily fixed to a generally plane fixing surface of the vibrative member, and that can house the damper mass within an interior space defined by the gate-shaped leaf spring with efficient space utilization.

(6) A vibration-damping device according to the above-indicated mode (5), further comprising a connecting plate by which the distal end portions of the pair of leg portions of the gate-shaped leaf spring are connected with each other. This arrangement is effective to increase strength of the gate-shaped leaf spring, thus facilitating handling or shipping the vibration-damping device itself. Also, the connecting plate fixes positions of the distal end portions of the pair of leg portions relative to each other, thus facilitating operations for attaching or fixing the vibration-damping device on the vibrative member.

(7) A vibration-damping device according to the above indicated mode (5) or (6), further comprising a stop mechanism for limiting an amount of displacement of the damper mass relative to the vibrative member, the stop mechanism being provided between a portion of a distal-end-side half of each of the pair of leg portions and a corresponding portion of the housing member of the damper mass, and including a stopper projection formed at one of the portions of the each of the leg portions and the housing member, and a stopper hole formed at an other one of the portions, and the stopper projection protrudes toward and extends through the stopper hole with a spacing therebetween. According to this mode of the invention, the stop mechanism can be constructed with a small number of components and with a simple and compact structure, while effectively utilizing the distal-end-side half of the each leg portion of the gate-shaped leaf spring. In particular, the distal-end-side half of the each leg portion of the gate-shaped leaf spring gives a minimal effect on spring characteristics of the gate-shaped leaf spring, thus effectively avoiding an adverse effect of the provision of the stop mechanism on the spring characteristics of the gate-shaped leaf spring. In addition, the distal-end-side half of the each leg portion of the gate-shaped leaf spring is displaced by a relatively small amount of displacement, upon application of vibrational loads to the vibration-damping device, whereby the amount of displacement of the damper mass relative to the vibrative member can be limited with stability. In this mode of the invention, the damper mass is preferably disposed within an area defined by and between the top plate portion and the pair of leg portions of the gate-shaped leaf spring.

(8) A vibration-damping device according to the above-indicated mode (7), wherein the stopper projection comprises a stopper bolt screwed into the portion of the housing member, and the stopper hole comprises a through hole formed at the portion of the each of the leg portions and an abutting tube integrally formed at a peripheral portion of the through hole so as to protrude at least one of opposite surfaces of the each of the leg portions. According to this mode of the invention, the stop mechanism can be easily constructed by utilizing the bolt. Also, the provision of the abutting tube formed at the peripheral portion of the through hole can assure a stability and an anti-load capacity at an abutting portion of the stopper hole with which the stopper bolt is brought into abutting contact.

(9) A vibration-damping device constructed according to any one of the above-indicated modes (1)–(8), wherein the metallic spring member may be made of a metallic material having a loss factor of not greater than 0.07. The metallic spring member made of such a metallic material has a low temperature dependency, thus assuring a stable damping effect of the vibration-damping device. Moreover, the metallic spring member made of such a metallic material permits the displacement of the damper mass with a relatively large amplitude, thus effectively exciting jumpily displacement of the independent mass member with respect to the housing member, and efficiently causing resultant impact of the independent mass member on the housing member. Therefore, the vibration-damping device of this mode of the invention can exhibit a desired damping effect, effectively.

(10) A vibration-damping device according to any one of the above-indicated modes (1)–(9), wherein the accommodation space defined within the housing member is fluid-tightly closed from an external area. This arrangement can avoid undesirable entrance of the dust or other foreign substances into the accommodation space defined by the housing member, thereby effectively preventing deterioration or insecurity of the vibration damping effects due to such dust. Thus, the vibration-damping device can assure an improved reliability and stability in its damping capability.

(11) A vibration-damping device constructed according to any one of the above-indicated modes (1)–(10), wherein the independent mass member has a mass within a range of 10–1000 g, more preferably 50–500 g. Namely, the independent mass member having the mass of 1000 g or smaller, more preferably 500 g or smaller, is likely to be displaced upon application of vibrational loads to the housing member, making it possible to excite the jumpily displacement of the independent mass member more easily and efficiently. Also, the independent mass member having the mass of 10 g or larger more preferably 50 g or larger, ensures the vibration-damping device to exhibit an excellent damping effect based on the impact of the independent mass member on the housing member.

(12) A vibration-damping device according to any one of the above-indicated modes (1)–(11), wherein a total mass of the independent mass member is held within a range of 5–15% of a mass of the vibrative member. Namely, if the mass of the independent mass member is made smaller than 5% of the mass of the vibrative member, the vibration-damping device possibly suffers from difficulty in exhibiting a desired damping effect, and if the mass of the independent mass member is larger than 15% of the mass of the vibrative member, the vibration-damping device suffers from a problem of increase in the overall weight of the device. In order to ensure the vibration-damping device to exhibit a desired damping effect on the basis of the impact of the independent mass member on the housing member in a further effective manner, the total mass of the independent mass member is held within a range of 5–10% of the mass of the vibrative member, preferably.

(13) A vibration-damping device according to any one of the above-indicated modes (1)–(12), wherein the elastic member has a Shore D hardness of not greater than 80 as measured in accordance with ASTM method D-2240. This arrangement makes it possible to reduce impact noises upon impact of the independent mass member on the housing member. To the same end, the elastic member may have a modulus of elasticity within a range of $1$–$10^4$ MPa, more preferably, $1$–$10^3$ MPa, and a loss tangent is not less than $10^{-3}$, more preferably within a range of 0.01–10.

(14) A vibration-damping device according to any one of the above-indicated modes (1)–(13), wherein the independent mass member is able to travel by a distance of 0.1–1.6 mm, more preferably 0.1–1.0 mm, in a radial direction perpendicular to the principal elastic axis of the metallic spring member between abutting portions of an inner surface of the housing member, which are opposed to each other in the radial direction with the independent mass member interposed therebetween. This arrangement makes it possible to minimize an amount of inclination or tilt of the independent mass member during its jumpily displacement, thus further stabilizing condition upon impact of the independent mass member on the housing member.

BRIEF DESCRIPTION OF THE DRAWINGS

The forgoing and/or other objects features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
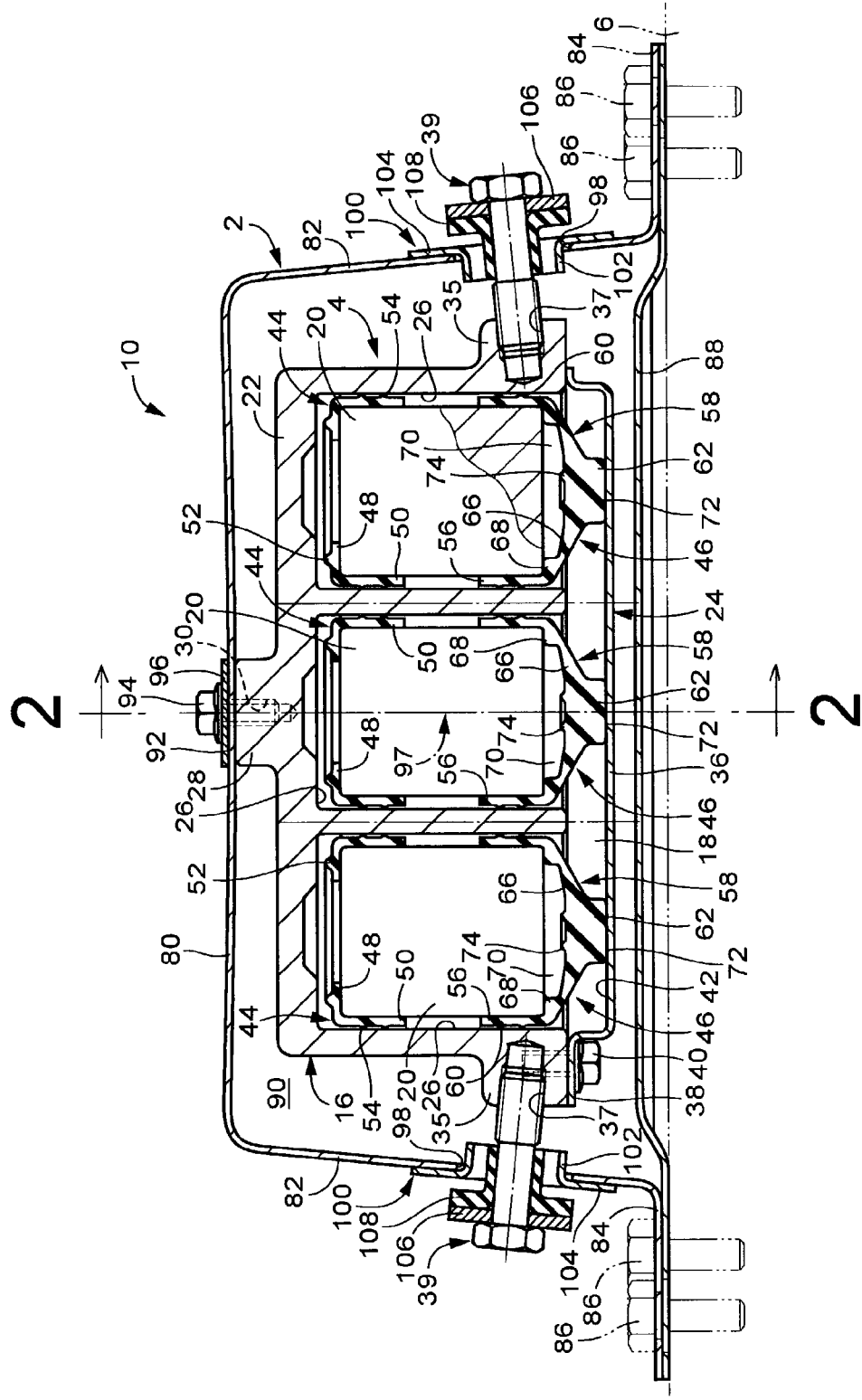
FIG. 1 is an elevational view in vertical or axial cross section of a vibration-damping device constructed according to a first embodiment of the invention.
Figure 2:
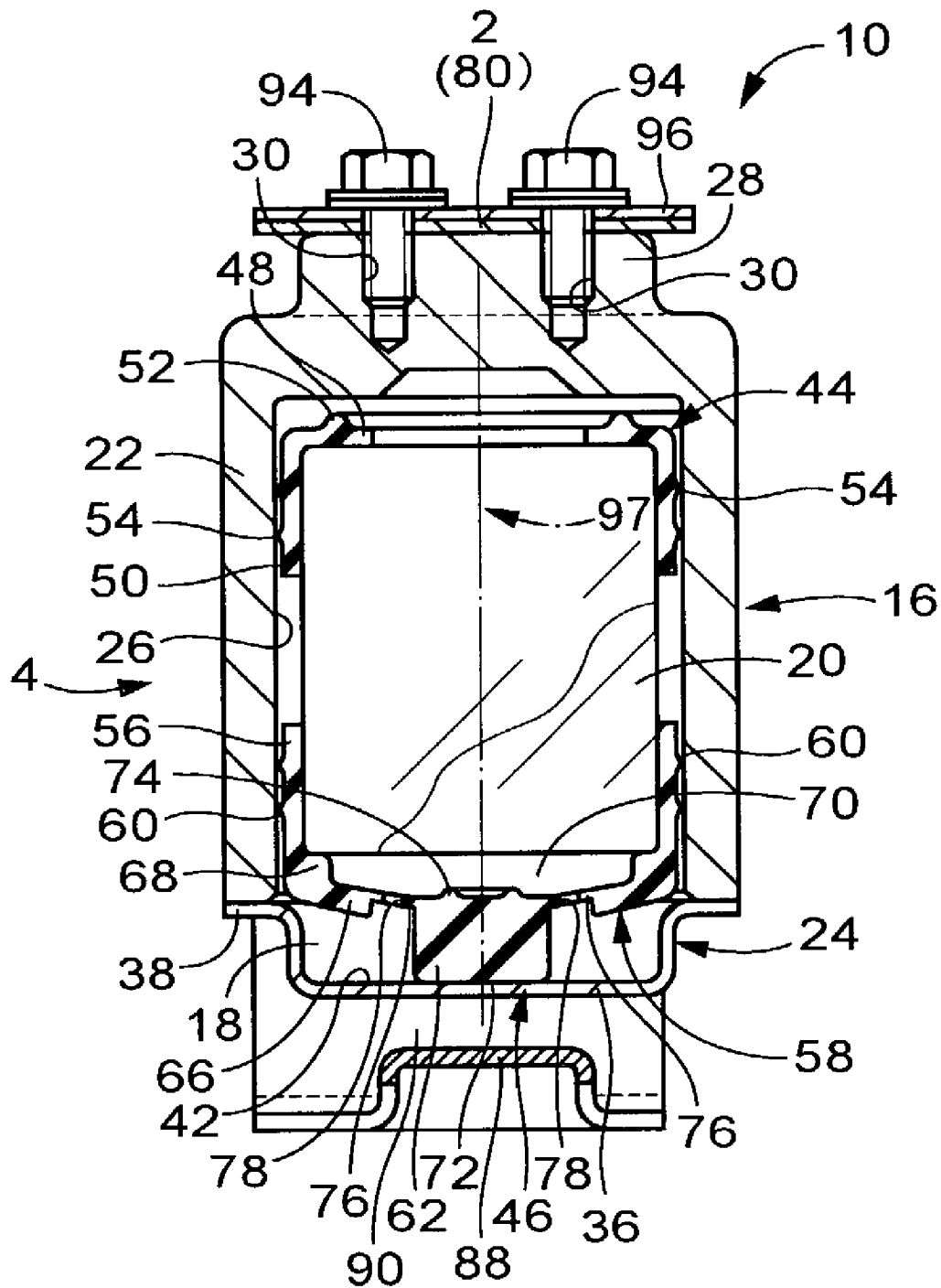
FIG. 2 is a cross sectional view taken along line 2—2 of FIG. 1.
Figure 3:
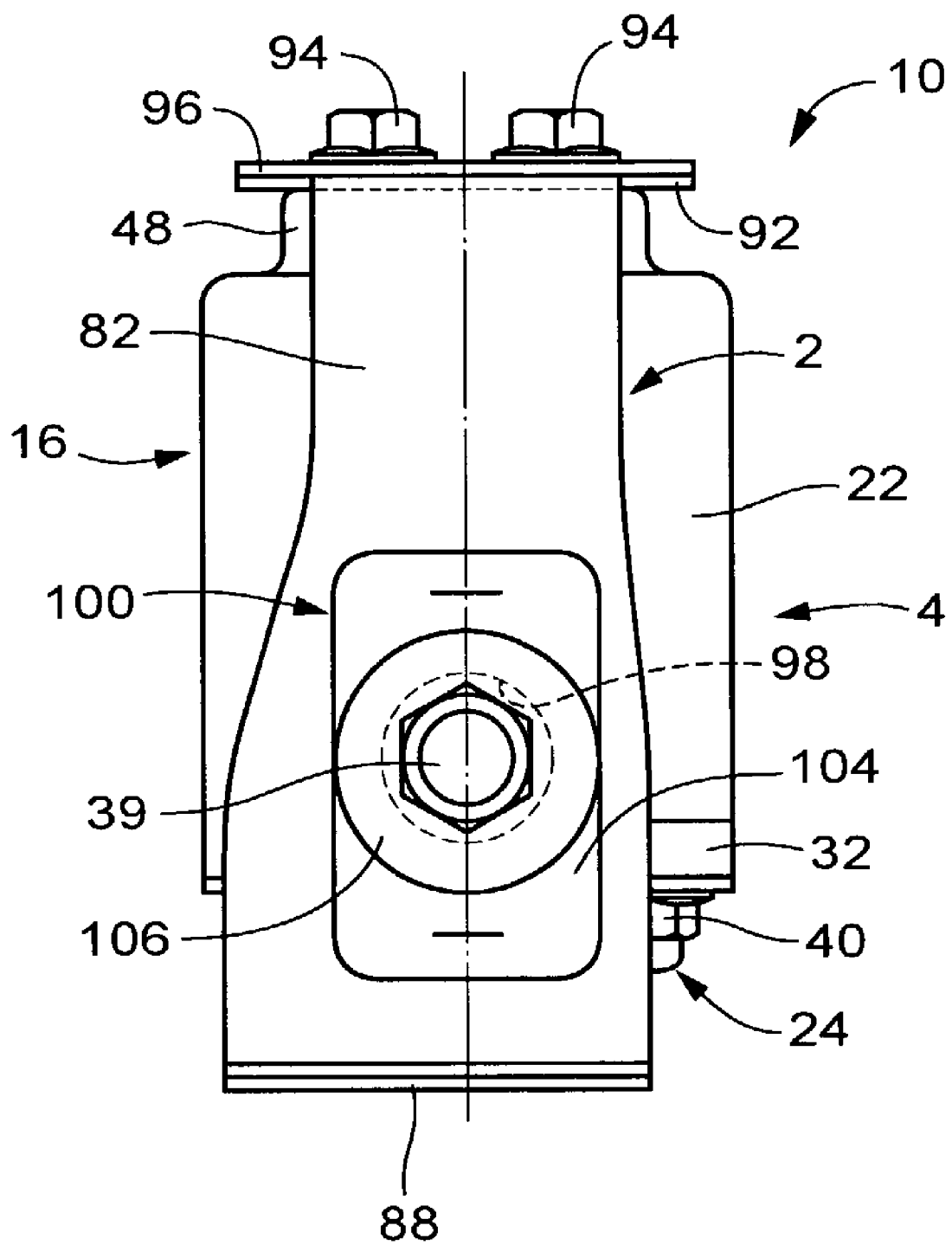
FIG. 3 is a left-side elevational view of the vibration-damping device of FIG. 1.
Figure 4:
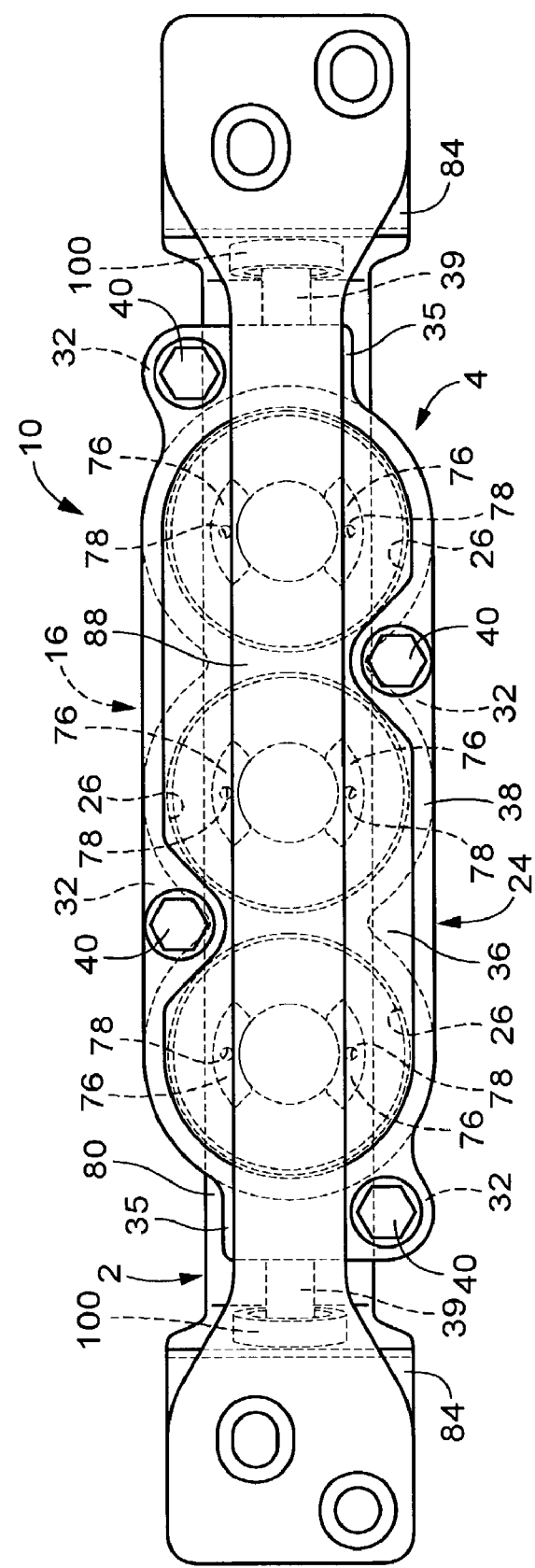
FIG. 4 is a bottom plane view of the vibration-damping device of FIG. 1.

Referring first to FIGS. 1–3, there is shown a vibration-damping device 10 constructed according to a first embodiment of the present invention. The vibration-damping device 10 includes a damper mass 4 and a gate-shaped leaf spring 2 for elastically supporting the damper mass 4 on a vibrative member 6 such as a body of an automotive vehicle. The gate-shaped leaf spring 2 is fixed to the vibrative member 6 so that the damper mass 4 is elastically supported by the gate-shaped leaf spring 2 on the vibrative member 6, thereby providing a secondary vibration system with respect to a primary vibration system in the form of the vibrative member 6. The vibration-damping device 10 may be adapted to damp primarily a vibrational load applied in the vertical direction, which is approximately parallel to the vertical direction as seen in FIG. 1. There will be described in detail the vibration-damping device 10 basically referring to the vertical direction as seen in FIG. 1.

The damper mass 4 includes a hollow housing member 16 defining an accommodation space 18 therein, and a plurality of mass members 20 housed within the accommodation space 18. The hollow housing member 16 includes a housing body 22 and a lower lid 24. The housing body 22 is a generally inverted-cup shaped member, wherein three inverted cylindrical cup members are arranged in series with their axes extending parallel to one another, and bonded together by integrating adjacent walls thereof. That is, the hollow housing member 16 has three recesses 26 arranged in series with a spacing therebetween, each extending in the vertical direction with a constant circular cross sectional shape, and each being open in an axially lower end face of the housing body 22.

The housing body 22 includes a support projection 28 that is integrally formed at a central portion of an upper wall of the housing body 22 so as to protrude axially upwardly as seen in FIG. 1, for fixing the housing body 22 to the gate-shaped leaf spring 2. The support projection 28 is formed with a tapped hole 30. Further, a plurality of fixing plates 32 are integrally formed at respective portions of an outer circumference of an axially lower end portion of the housing body 22, so as to extend in a radially outward direction perpendicular to axial directions of the three recesses 26. A screw hole is formed through each of the fixing plates 32 for fixing the lower lid 24 to the axially lower end face of the housing body 22. Also, a pair of bolt fixing portions 35 are integrally formed at longitudinally opposite end portions of the axially lower end portion of the housing body 22 so as to protrude outwardly in the longitudinal direction of the housing body 22 in which the recesses 26 are arranged in series. Each bolt-fixing portion 35 has a tapped hole 37 open in its outer circumferential surface, and a top end portion of a stopper projection in the form of a stopper bolt 39 is screwed into and fixed to the tapped hole 37 with its leg and head portions protruding outwardly from the housing body 22 in a direction slightly inclined upwardly with respect to the longitudinal or horizontal direction as seen in FIG. 1.

The housing body 22 may be formed of a metallic material or other materials having a sufficient rigidity and strength so as not to be deformed by impact thereof on a mass member 20 (which will be described later). For instance, the housing body 22 may be formed of cast iron, in the light of efficiency and a cost of manufacture of the housing body 22. To ensure a high dimensional accuracy of each recess 26 of the housing body 22, an inner circumferential surface and a bottom surface of the recess 26 is desirably finished, e.g., by cutting.

Likewise, the lower lid 24 may be formed of a metallic material or other materials having a sufficient rigidity and strength so as not to be deformed by the impact thereof with the mass member 20 (which will be described later). For instance, the lower lid 24 may be formed of ferrous metal by pressing, in the light of efficiency and a cost of manufacture of the lower lid 24. The lower lid 24 has a shallow dish-like shape in its entirety, and includes a central recessed portion 36 and an outward flange portion 38 integrally formed at a peripheral portion of an opening of the central recessed portion 36. The central recessed portion 36 is shaped to generally conform to a shape of the lower surface of the housing body 22, for extending across and covering all openings of the three recesses 26 of the housing body 22.

The lower lid 24 is laminated onto the lower surface of the housing body 22 with its outward flange portion 38 being held in contact with an outer peripheral portion of the lower surface of the housing body 22. In this state, the outward flange portion 38 of the lower lid 24 is fixed to the fixing plates 32 of the housing body 22, by means of fixing bolts 40. As a result, the openings of the three recesses 26 of the housing body 22 are entirely closed by the central recessed portion 36 of the lower lid 24. It is noted that a bottom surface 42 of the central recessed portion 36, which is opposed to the openings of the three recesses 26, extends horizontally and is made flat over its approximately entire area.

Namely, the lower lid 24 is fixed to the lower end face of the housing body 22 as described above, and the openings of the three recesses 26 of the housing body 22 is closed by the lower lid 24, whereby the hollow housing member 16 is provided. The thus formed hollow housing member 16 includes therein the accommodation space 18 that is defined by the vertically extending three recesses 26 and the central recessed portion 36 with which the three recesses 26 are connected one another at their lower end portions. Since the outer peripheral portion of the lower end face of the housing body 22 is held in close contact with the outward flange portion 38 of the lower lid 24, the accommodation space 18 is isolated from the external area.

The accommodation space 18 houses three mass members 20 disposed in three recesses 26, respectively. Each of the mass members 20 is a pillar shaped mass, e.g., a solid cylindrical block member made of iron or other metallic materials having higher gravities. Each mass member 20 has an outer diameter, i.e., a diameter of a circular cross section, which is made slightly smaller than an inner diameter of the corresponding recess 26 of the housing member 16, and also has an axial dimension that is slightly smaller than a depth dimension of the corresponding recess 26.

Hereinafter, one of the three mass members 20 will be described in detail, since the three mass members 20 are identical with each other in terms of structure. An upper cushioning cover 44 and a lower cushioning cover 46 functioning as an elastic member in the form of a shear-type rubber elastic body, are fitted onto an axially upper and lower end portions of the mass member 20. The upper cushioning cover 44 includes an annular plate-like upper wall portion 48 and a cylindrical portion 50 integrally formed at a periphery of the upper wall portion 48 so as to extend axially downwardly. Namely, the upper cushioning cover 44 is shaped as a solid of revolution, which extending circumferentially with a constant cross section of a thin inverted "L" shape. The upper cushioning cover 44 is an integral rubber elastic body member, and is dimensioned such that an inner diameter of the cylindrical portion 50 is made slightly smaller than the outer diameter of the corresponding mass member 20. The upper cushioning cover 44 is further provided with annular rib-like projections 52, 54, 54. Described in detail, the annular rib-like projection 52 is integrally formed at a radially intermediate portion of an upper surface of the upper wall portion 48 so as to extend circumferentially and protrude axially outwardly. The annular rib-like projections 54, 54, on the other hand, are integrally formed at respective axially intermediate portions of an outer circumferential surface of the cylindrical portion 50 so as to extend circumferentially and protrude radially outwardly.

The upper cushioning cover 44 constructed as described above is formed independent of the mass member 20, and press-fitted onto the axially upper end portion of the mass member 20, which may be subjected to an adhesive treatment, as needed. In this state, the upper wall portion 48 of the upper cushioning cover 44 is held in close contact with the axially upper end face of the mass member 20, while the cylindrical portion 50 of the upper cushioning cover 44 is held in close contact with the outer circumferential surface of the axially upper end portion of the mass member 20. As a result, the upper cushioning cover 44 covers entirely a circumferential edge formed in the axially upper end portion of the mass member 20.

On the other hand, the lower cushioning cover 46 includes a cylindrical portion 56 functioning as a rubber buffer and a bottom wall portion 58 integrally formed at an axially lower part of the cylindrical portion 56. That is, the lower cushioning cover 46 is an integral rubber elastic body member having a generally cylindrical cup shape in its entirety. The cylindrical portion 50 has an inner diameter that is made slightly smaller than the outer diameter of the mass member 20. Annular rib-like projections 60, 60 are formed at respective axially intermediate portions of an outer circumferential surface of the cylindrical portion 50 so as to extend circumferentially and protrude radially outwardly.

The bottom wall portion 58 of the lower cushioning cover 46 includes a central block-shaped abutting part 62 and a peripheral elastic support part 66, which are integrally formed with each other The abutting part 62 is a block-like member extending axially outwardly or downwardly as seen in FIG. 2, with a generally constant circular cross sectional shape. The elastic support part 66 extends radially outwardly and axially upwardly from an axially upper peripheral portion of the abutting part 62 so that the elastic support part 66 has a tapered or a funnel-like shape with a given gradient. The elastic support part 66 is integrally connected at its outer peripheral portion to a peripheral portion of an axially lower end portion of the cylindrical portion 56.

The lower cushioning cover 46 constructed as described above is formed independent of the upper cushioning cover 44 as well as the mass member 20, and is press-fitted onto the axially lower end portion of the mass member 20, which may be subjected to an adhesive treatment, as needed. In this state, the cylindrical portion 56 of the lower cushioning cover 46 is held in close contact with an outer circumferential surface of the axially lower end portion of the mass member 20, while the elastic support part 66 of the bottom wall portion 58 of the lower cushioning cover 46 protrudes axially downwardly from and is disposed on an axially lower end face of the mass member 20 with a spacing therebetween. As a result, the lower cushioning cover 46 covers entirely the axially lower end portion of the mass member 20, including the lower end face of the mass member 20.

The lower cushioning cover 46 further includes a support projection 68 integrally formed at a conjunction between the outer peripheral portion of the elastic support part 66 and the lower end portion of the cylindrical portion 56, so as to extend radially inwardly by a given radial distance, while extending circumferentially over an entire circumference of the conjunction. This support projection 68 is adapted to support a peripheral portion of the lower end face of the mass member 20, which is held in abutting contact with the support projection 68. With the lower cushioning cover 46 mounted on the axially lower end portion of the mass member 20 as described above, the elastic support part 66 and the abutting part 62 are substantially entirely disposed on the axially lower side of the lower end face of the mass member 20 with a given spacing therebetween. That is, the elastic support part 66 and the abutting part 62 of the lower cushioning cover 46 cooperate with the mass member 20 to define therebetween a void 70 that permits an axial displacement of the abutting part 62 as a result of elastic deformation of the elastic support part 66.

The abutting part 62 of the lower cushioning cover 46 is disposed coaxially with the mass member 20, and has an abutting surface 72 with a circular shape extending in a radial direction perpendicular to an axis thereof. A rib-like projection is integrally formed on the abutting surface 72 so as to extend circumferentially about the axis of the abutting part 62, which is elastically compressed by the weight of the mass member 20 and is not apparent in FIGS. 1 and 2. The provision of the rib-like projection permits an adjustment of an initial spring characteristics of the abutting surface 72 during impact thereof on the lower lid 24 of the hollow housing member 16, and an elimination or reduction of undesirable impact noises. Preferably, the abutting surface 72 of the abutting part 62, where the rib-like projection is formed, is arranged to have a Shore D hardness of not greater than 80 as measured in accordance with ASTM method D-2240, a modulus of elasticity within a range of $1\text{--}10^4$ MPa, and a loss tangent not less than $10^{-3}$. Further, a rib-like projection 74 is integrally formed on an axially upper end face of the abutting part 62 so as to extend circumferentially about the axis of the abutting part 62, while extending axially upwardly toward the axially lower end face of the mass member 20 in the void 70. When the elastic support part 66 is excessively deformed, the abutting part 62 is brought into abutting contact with the lower end face of the mass member 20 via the rib-like projection 74, whereby the provision of the rib-like projection 74 can eliminate or moderate undesirable impact noises generated upon impact of the mass member 20 and the abutting part 62.

In order to adjust spring characteristics of the elastic support part 66, a pair of thin-walled portions 76, 76 are formed in respective circumferential portions of the elastic support part 66, which portions are opposed to each other in a diametric direction of the abutting part 62 with the abutting part 62 interposed therebetween. Each of the thin-walled portions 76 extends circumferentially by a circumferential length that is approximately equal to a quarter of an entire circumference of the elastic support part 66 with a given width dimension. The thin-walled portions 76, 76 are formed at their central portions with through holes 78, 78, respectively, whereby an inner side of the void 70 is exposed to the external area through these through holes 78, 78.

The three mass members 20, each being equipped with the upper and the lower cushioning covers 44, 46 as described above, are housed within the accommodation space 18 of the hollow housing member 16 such that these three mass members 20 are disposed in the three recesses 26 of the housing body 22, respectively. In this state, each mass member 20 is axially movable back and force, or is axially jumpily displaceable within the corresponding recess 26, while being independent of the hollow housing member 16.

In the present embodiment, the largest diameters of the upper and the lower cushioning covers 44, 46, namely, an outer diameter of the rib-like projection 54 formed on the cylindrical portion 50 of the upper cushioning cover 44 and an outer diameter of the rib-like projection 60 formed on the cylindrical portion 56 of the lower cushioning cover 46 are made smaller by 0.1–1.6 mm than the inner diameter of the recess 26 of the housing body 22. On the other hand, the largest axial dimension of the mass member 20, i.e., the dimension between a protruding end portion of the rib-like projection 52 formed on the upper wall portion 48 of the upper cushioning cover 44 and the abutting surface 72 of the abutting part 62 of the lower cushioning cover 46, is made smaller by 1.0 mm or more, more preferably by 1.0–3.0 mm, than an axial distance between the upper wall surface of the recess 26 of the housing member 22 and the bottom surface 42 of the lower lid 24. In this respect, the "largest axial dimension" of the mass member 20 should be interpreted to mean the axial dimension of the mass member 20 that is measured in a static state where the mass member 20 is statically placed on the bottom surface 42 of the lower lid 24 with the lower cushioning cover 46 is elastically deformed or compressed by a given amount due to the gravity acting on the mass member 20.

Namely, an excessively small radial gap distance between each mass member 20 and the corresponding recess 26 is likely to cause undesirable friction or contact between the mass member 20 and the recess 26 when vibrational loads are applied to the vibration-damping device 10. This undesirably restricts axial displacement of the mass member 20 relative to the housing member 16, making it difficult for the vibration-damping device 10 to exhibit a damping effect on the basis of impact of the mass member 20 on the housing member 16 caused by the axial displacement of the mass member 20 relative to the housing member 16. On the other hand, an excessively large radial gap distance between each mass member 20 and the corresponding recess 26 is likely to cause irregular displacement of the mass member 20, e.g., a tilt of the mass member 20, making it difficult for the vibration-damping device 10 to exhibit the desired damping effect with stability. Meanwhile, the axial dimension of the accommodation space 18 may be determined so as to permit a substantially independent axial displacement of the mass member 20 relative to the hollow housing member 16. An excessively large axial dimension of the accommodation space 18 may waste the space.

In order to permit the mass member 20 to bound off completely, namely to be completely spaced away from the bottom surface 42 of the lower lid 24, during the jumpily displacement of the mass member 20 within the accommodation space 18, the accommodation space 18 needs to be dimensioned to have an inside axial length that is made larger than the sum of the largest axial dimension of the mass member 20 in its static state and the axial length of the lower cushioning cover 46 that is elastically deformed due to the weight of the mass member 20. However, the mass member 20 is just required to make a jumpily displacement enough to apply repeatedly effective loads (i.e., active loads) to the hollow housing member 16. Namely, the abutting surface 72 of the lower cushioning cover 46 is not necessarily required to be actually spaced away from the bottom surface 42 of the lower lid 24. In the present embodiment, particularly, the mass member 20 is forced to be displaced in a direction approximately equal to a gravitational direction so that the mass member 20 is restored to its static (initial) position owing to the gravity acting thereon. Therefore, the upper cushioning cover 44 needs not to be held in abutting contact with the upper wall surface of the recess 26 of the housing body 22, when vibrations to be damped are applied to the vibration-damping device 10. The vibration-damping device 10 is capable of exhibiting a desired vibration damping effect based on repeated loads effectively acting on the housing member 16 caused only by the abutting contact of the lower cushioning cover 46 on the lower lid 24.

The gate-shaped leaf spring 2 is formed of a spring-steel sheet with a generally constant width, and is shaped by bending to have a top plate portion 80 extending horizontally and a pair of leg portions 82, 82 integrally formed at longitudinally opposite end portions of the top plate portion 80 so as to extend downwardly in the vertical direction. The pair of leg portions 82, 82 are also bent at its lower end portions in the longitudinally outward direction to thereby provide fixing plate portions 84, 84, functioning as a plurality of fixing portion of the metallic spring member. Thus, the gate-shaped leaf spring 2 is placed at its fixing plate portions 84, 84 on the vibrative member 6 and fixed to the vibrative member 6 by means of a plurality of fixing bolts 86. In order to improve stability of the gate-shaped leaf spring 2 in the horizontal direction as seen in FIG. 1, the pair of leg portions 82, 82 of the gate-shaped leaf spring 2 extend vertically downwardly while extending slightly outwardly in the horizontal direction. The fixing plate portions 84, 84 of the gate-shaped leaf spring 2 are connected with each other via a plane longitudinal connecting plate 88. The connecting plate 88 extends across a longitudinal space between the fixing plate portions 84, 84 and is connected at its longitudinally opposite end portions to the fixing plate portions 84, 84 by welding. The provision of the connecting plate 88 is effective to fix the positions of the fixing plate portions 84, 84 relative to each other, thereby assuring high stability of the entire shape of the gate-shaped leaf spring 2. It should be noted that the gate-shaped leaf spring 2 constructed as described above consists of a horizontally opposite halves which are made symmetrical, so that a principal elastic axis 97 of the gate-shaped leaf spring 2 extends in an approximately vertical direction through a center of the top plate portion 80.

In the gate-shaped leaf spring 2, the top plate portion 80, the pair of leg portions 82, 82 and the connecting plate 88 cooperate to define therebetween a generally rectangular space 90 in which the damper mass 4 constructed as described above is accommodated. Described in detail, the support projection 28 formed on the central portion of the upper wall portion of the hollow housing member 16 of the damper mass 4 is superposed onto a lower surface of a wide support portion 92 of the top plate portion 80 of the gate-shaped leaf spring 2, and firmly fixed to the support portion 92 by means of two bolts 94, 94 so that the damper mass 4 is suspended from the top plate portion 80 of the gate-shaped leaf spring 2. In this respect, a reinforcing plate 96 is superposed on and welded to the support portion 92 of the top plate portion 80 of the gate-shaped leaf spring 2.

That is, the damper mass 4 is disposed within a rectangular space 90 such that a vertical line extending through a center of gravity of the damper mass 4 is approximately aligned to a principal elastic axis 97 of the gate-shaped leaf spring 2. Namely, the damper mass 4 has an approximately coaxial relationship with the gate-shaped leaf spring 2, and is firmly fixed to the gate-shaped leaf spring 2 by means of the bolts 94, 94. In this arrangement, an oscillating force generated by a displacement of the center of gravity of the damper mass 4 is generally applied to the gate-shaped leaf spring 2 in a direction approximately aligned to the principal elastic axis 97. Moreover, since the center of gravity of the damper mass 4 is generally located on the principal elastic axis 97 of the gate-shaped leaf spring 2, the damper mass 4 can be displaced more likely in the vertical direction, thereby effectively limiting undesirable irregular displacement of the damper mass 4, e.g., a torsion-displacement.

The leg portions 82, 82 of the gate-shaped leaf spring 2 are formed with through holes 98, 98, respectively, each being located at a distal-end-side half or a base-side part in the lengthwise direction and a central part in the width direction of the corresponding leg portion 82. A flanged collar 100 is fitted into each through hole 98 to thereby provide a stopper hole. The flanged collar 100 includes a short tubular collar 102 functioning as an abutting tube, and an outward flange 104 integrally formed at one of axially opposite end portions of the collar 102, so as to extend outwardly to form a rectangular plate shape. The flange collars 100, 100 are fixed to the leg portions 82, 82 of the gate-shaped leaf spring 2, respectively, such that the collars 102, 102 are press-fitted into the through holes 98, 98, while the outward flanges 104, 104 are held in contact with and welded to the outer surfaces of the leg portions 82, 82, respectively. The stopper bolts 39, 39 protruding outwardly from the hollow housing member 16 extend outwardly through the flanged collars 100, 100, respectively, as seen in FIG. 1.

Each flanged collar 100 has an inner diameter that is made sufficiently larger than a diameter of a shank of the corresponding stopper bolt 39 so as to permit displacement of the damper mass 4, within a range in which the stopper bolt 39 is spaced away from the flanged collar 100, when the damper mass 4 is subjected to vibrations of general level. An annular washer 106 whose outer diameter is larger than an inner diameter of the collar 102 is fixed to a head-side portion of each stopper bolt 39 which protrudes axially outwardly from the flanged collar 100. This washer 106 is opposed to the flange portion 104 of the flanged collar 100 with a given spacing therebetween in a direction in which a central axis of the stopper bolt 39 extends. To each stopper bolt 39, a rubber buffer sleeve 108 is fixed so that an outer circumferential portion of the stopper bolt 39, which extends through the collar 102 of the flanged collar 100, and an end face of the washer 106 opposed to the flange portion 104 are entirely covered by the rubber buffer sleeve 108.

When an excessively large displacement of the damper mass 4 is caused due to an application of a large vibrational load, e.g., abrupt impact to the vibration-damping device 10, the stopper bolts 39, 39 are brought into abutting contact with the flanged collar 100 of the gate-shaped leaf spring 2 via the rubber buffer sleeve 108, to thereby limit an amount of displacement of the damper mass 4 and an amount of elastic displacement of the gate-shaped leaf spring 2, in a shock absorbing fashion. As is understood the aforesaid description, the stopper bolts 39, 39 and the flanged collars 100, 100 cooperate to constitute stop mechanisms, in the present embodiment.

In the vibration-damping device 10 constructed according to the first embodiment, the damper mass 4 is elastically connected to the vibrative member 6 functioning as a primary vibration system via the gate-shaped leaf spring 2. Therefore, the damper mass 4 and the gate-shaped leaf spring 2 cooperate to form a secondary vibration system wherein the damper mass 4 functions as a mass member while the gate-shaped leaf spring 2 functions as a spring member. That is, the vibration-damping device 10 is able to function as a dynamic damper in its entirety. A natural frequency of the secondary vibration system may be tuned to a frequency range of vibrations to be damped excited in the vibrative member 6, by suitably adjusting the mass or weight of the damper mass 4 and the dynamic spring constant of the gate-shaped leaf spring 2, making it possible for the vibration-damping device 10 to exhibit a desired damping effect with respect to the vibrative member 6.

Further, the mass members 20 are housed within the vibration-damping device 10 such that the mass members 20 are independently displaceable relative to the hollow housing member 16 in a primary vibration input direction that is approximately equal to the vertical direction. When a vibrational load is applied to the vibration-damping device 10, the mass members 20 are forced to move back and force in the vertical direction in relation to the hollow housing member 16, thereby causing repeated impact of the mass members 20 on the hollow housing member 16. Thus, the vibration-damping device 10 is able to exhibit a further improved damping effect with respect to the vibrative member 6.

In particular, the gate-shaped leaf spring 2 used as a spring component of the secondary vibration system makes it easy to align an elastic center of the damper mass 4 to the principal elastic axis 97 of the gate-shaped leaf spring 2, stably causing the displacement of the damper mass 4 in the vertical direction, i.e., a primary vibration input direction, when the vibration-damping device 10 is subjected to vibrational loads. Accordingly, the mass members 20 are stably and effectively displaced in the vertical direction, i.e., the primary vibration input direction, thereby causing stably and effectively jumpily displacement of the mass members 20 relative to the housing member 16 and resultant impact of the mass members 20 on the housing member 16. Thus, the vibration-damping device 10 can exhibit a desired damping effect in a further effective manner.

It is also appreciated regarding the vibration-damping device 10 of this embodiment that the abutting part 62 defining the abutting surface 72 of each mass member 20 with respect to the hollow housing member 16 is elastically connected to the mass member 20 via the funnel-shaped elastic support part 66 extending in a direction inclined to the primary vibration input direction, so that the elastic support part 66 is primarily subjected to shear deformation when the mass member 20 comes into impact on the hollow housing member 16. This arrangement permits the vibration-damping device 10 to surely exhibit a low dynamic spring constant at the abutting surface 72 of each mass member 20. For this reason, even if the input vibration has a small energy, a low frequency and a small amplitude, like vibrations excited in automotive vehicles, an oscillation or vibrative force effectively acts on the mass members 20 with the help of the elastic deformation of the elastic support parts 66, resulting in effective oscillation or displacement of the mass members 20. Therefore, the vibration-damping device 10 can efficiently excite the jumpily displacement of the mass members 20 relative to the hollow housing member 16, making it possible to exhibit a desired damping effect in a further effective manner.

Further, the elastic support part 66 and the abutting part 62, which cooperate to form the abutting portion of each mass member 20, is firmly fixed to the mass member 20, preventing that an abutting center of the abutting part 62 undesirably deviates or offsets from its desired position with respect to a center of gravity of the mass member 20. This arrangement allows the mass member 20 to be brought into impact on the housing member 16 with a stabilized condition as measured at its abutting portion, further stabilizing the damping effect of the vibration-damping device 10 based on the impact of the mass members 20 on the hollow housing member 16.

Figure 5:
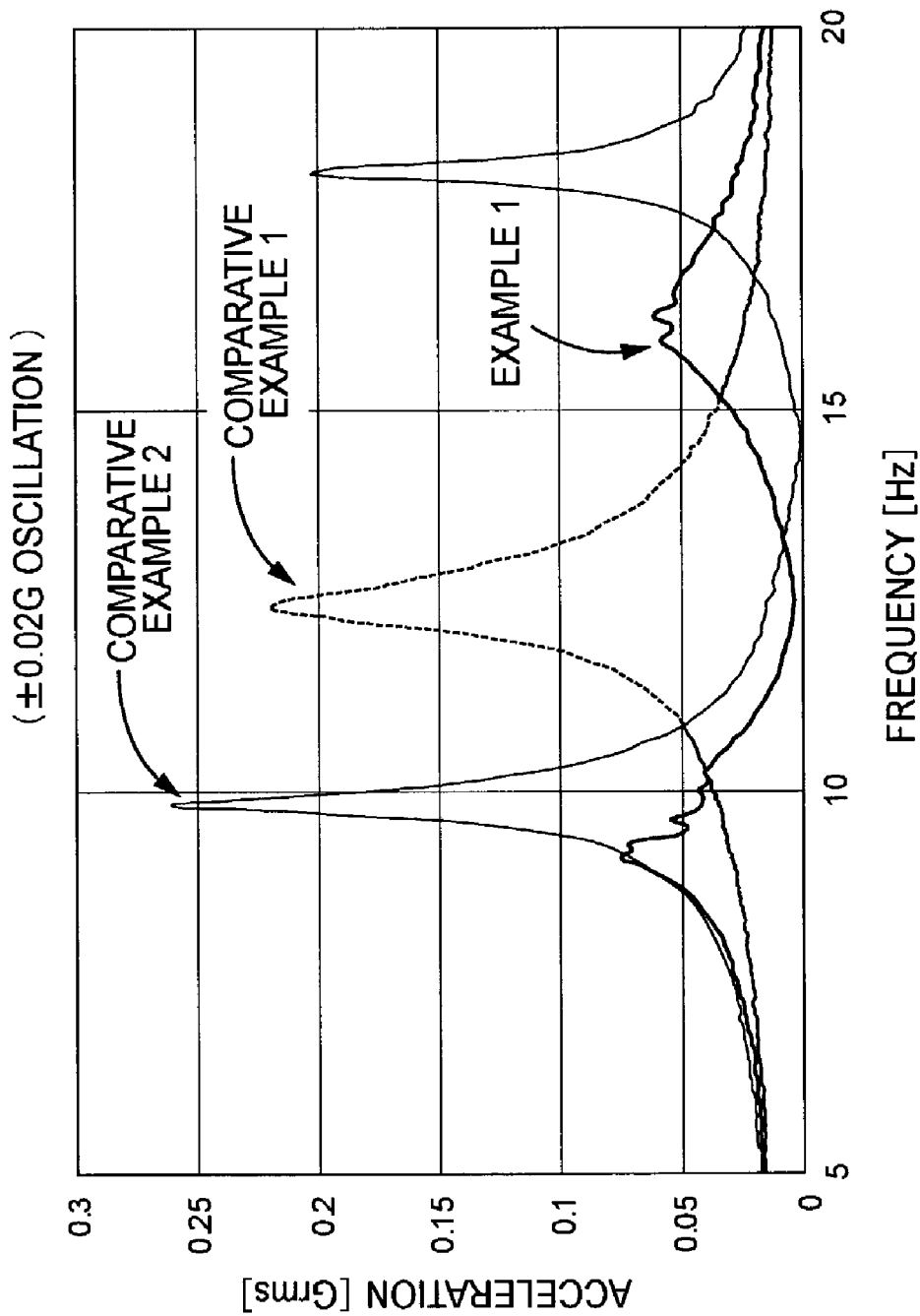
FIG. 5 is a graph showing frequency characteristics of damping effects measured in the vibration-damping device of FIG. 1, together with those measured in vibration-damping devices constructed according to comparative examples 1 and 2.

An example of the vibration-damping device 10 constructed according to the present embodiment was installed on a vibrative member of resonance type, whose resonance amplitude magnification is maximized at a specific frequency range. Then, vibration-damping characteristics of the vibration-damping device 10 were actually measured by means of an acceleration sensor attached to the vibrative member, when the vibrative member was oscillated. The results of the measurements are indicated in the graph of FIG. 5 as an example 1. In the graph of FIG. 5, a vertical axis represents output values of the acceleration sensor. Output values of the acceleration sensor were detected when the vibrative member with no vibration damper attached was oscillated. The obtained measurements are indicated in the graph of FIG. as a comparative example 1. Another comparative example was formed by fixing the three mass members 20 to the hollow housing member 16 so as to inhibit displacements of these three mass members 20 in relation to the hollow housing member 16 Vibration-damping characteristics of this comparative example were also measured in the same manner. The results of the measurements are also indicated in the graph of FIG. 5 as a comparative example 2. As is understood from the graph of FIG. 5, the vibration-damping device 10 constructed according to the present embodiment is capable of exhibiting a vibration damping effect with the help of the secondary vibration system or a dynamic damper including a mass component in the form of the damper mass 4 and a spring component in the form of the gate-shaped leaf spring 2. In addition, the vibration-damping device 10 can exhibit a high damping effect with respect to low frequency vibrations based on the repeated impact of the mass members 20 on the hollow housing member 16 as a result of the free displacement of the mass members 20 within the hollow housing member 16. Further, the vibration-damping device 10 is able to restrict or attenuate a peak value or undesirable increase of transmissibility of vibrations at two frequency ranges located upper and lower sides of the frequency range which corresponds a frequency of the vibration to be damped, on the basis of the impact of the mass members 20 on the hollow housing member 16. Therefore, the vibration-damping device 10 can exhibit an excellent vibration damping effect with respect to vibrations over an extremely wide frequency range.

Figure 6:
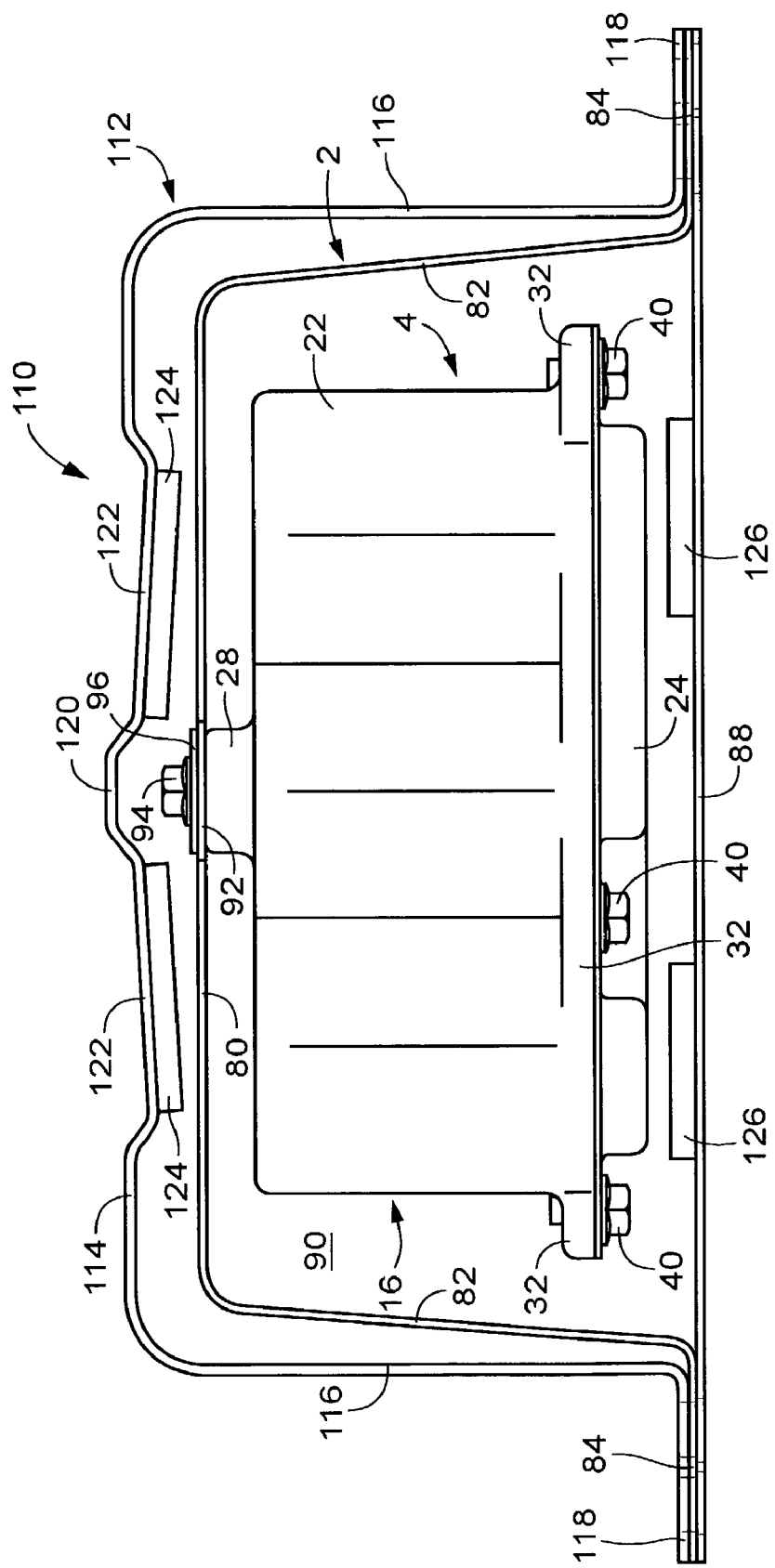
FIG. 6 is a front elevational view of a vibration-damping device constructed according to a second embodiment of the invention.

Referring next to FIG. 6, there is illustrated a vibration-damping device 110 constructed according to a second embodiment of the present invention, which is identical with the first embodiment, except the arrangement for a stopper mechanism. In the interest of brevity, the same reference numerals as used in the first embodiment will be used in the second embodiment to identify the structurally and/or functionally corresponding elements, and no detailed description of these elements will be provided.

The vibration-damping device 110 of this embodiment includes a metallic stop member 112 with a gate-shape some-what larger than the gate-shaped leaf spring 2. This metallic stop member 112 is disposed over the gate-shaped leaf spring 2 with a given spacing therebetween. More specifically, the stop member 112 is formed by bending of a metallic plate having rigidity larger than that of the gate-shaped leaf spring 2. Like the gate-shaped leaf spring 2, the stop member 112 includes a top plate portion 114 extending horizontally, a pair of leg portions 116, 116 integrally formed at longitudinally opposite end portions of the top plate portion 114 so as to extend downwardly in the vertical direction, and a pair of fixing plate portions 118, 118 integrally formed at lower end portions of the leg portions 116, 116, respectively. The fixing plate portions 118, 118 of the stop member 112 are superposed on and welded to the fixing plate portions 84, 84 of the gate-shaped leaf spring 2. In this state, the stop member 112 is fixedly disposed over the gate-shaped leaf spring 2 with its top plate portion 114 and its leg portions 116, 116 opposed to the top plate portion 80 and the leg portions 82, 82 of the gate-shaped leaf spring 2, respectively, with a spacing therebetween.

The top plate portion 114 of the stop member 112 is formed with a convex portion 120 at its central portion so as to prevent a collision of the bolt 94 with the stop member 112 upon elastic deformation of the gate-shaped leaf spring 2. On the longitudinally opposite sides of the convex portion 120 as seen in FIG. 6, a pair of support portions 122, 122 are formed such that the support portions 122, 122 extend longitudinally outwardly from the convex portion 120 with a downward gradient. Namely, the spacing between the top plate portion 80 of the gate-shaped leaf spring 2 and each support portion 122 gradually increases as its longitudinal position comes closer to the convex portion 120. Sheet shaped rubber buffers 124, 124 having a given thickness are bonded to the lower surfaces of the support portions 122, 122.

Also, sheet shaped rubber buffers 126, 126 having a given thickness are bonded to respective portions on the connecting plate 88 that connects the leg portions 82, 82 of the gate-shaped leaf spring 2 with each other, so as to be opposed to the lower lid 24 of the damper mass 4 with a given spacing therebetween.

According to the vibration-damping device 110 constructed as described above, when an excessively large vibrational load is applied to the vibration-damping device 110 in the vertical direction, the damper mass 4 is brought into abutting contact with the connecting plate 88 via the rubber buffers 126, 126, thereby limiting an amount of displacement of the damper mass 4 in a bound direction (i.e., a downward direction as seen in FIG. 6) in a shock absorbing manner. In the same condition, the top plate portion 80 of the gate-shaped leaf spring 2 is brought into abutting contact with the top plate portion 114 of the stop member 112 via the rubber buffers 124, 124, so as to limit the amount of displacement of the damper mass 4 in a rebound direction (i.e., an upward direction as seen in FIG. 6) in a shock absorbing manner.

The vibration-damping device 110 of the present embodiment includes the gate-shaped leaf spring 2 and the damper mass 4, which are structurally identical with these members 2, 4 in the vibration-damping device 10 of the first embodiment. It should be appreciated that the vibration-damping device 110 can enjoy the same advantages of the present invention as described above with respect to the vibration-damping device 10 of the first embodiment.

Figure 7:
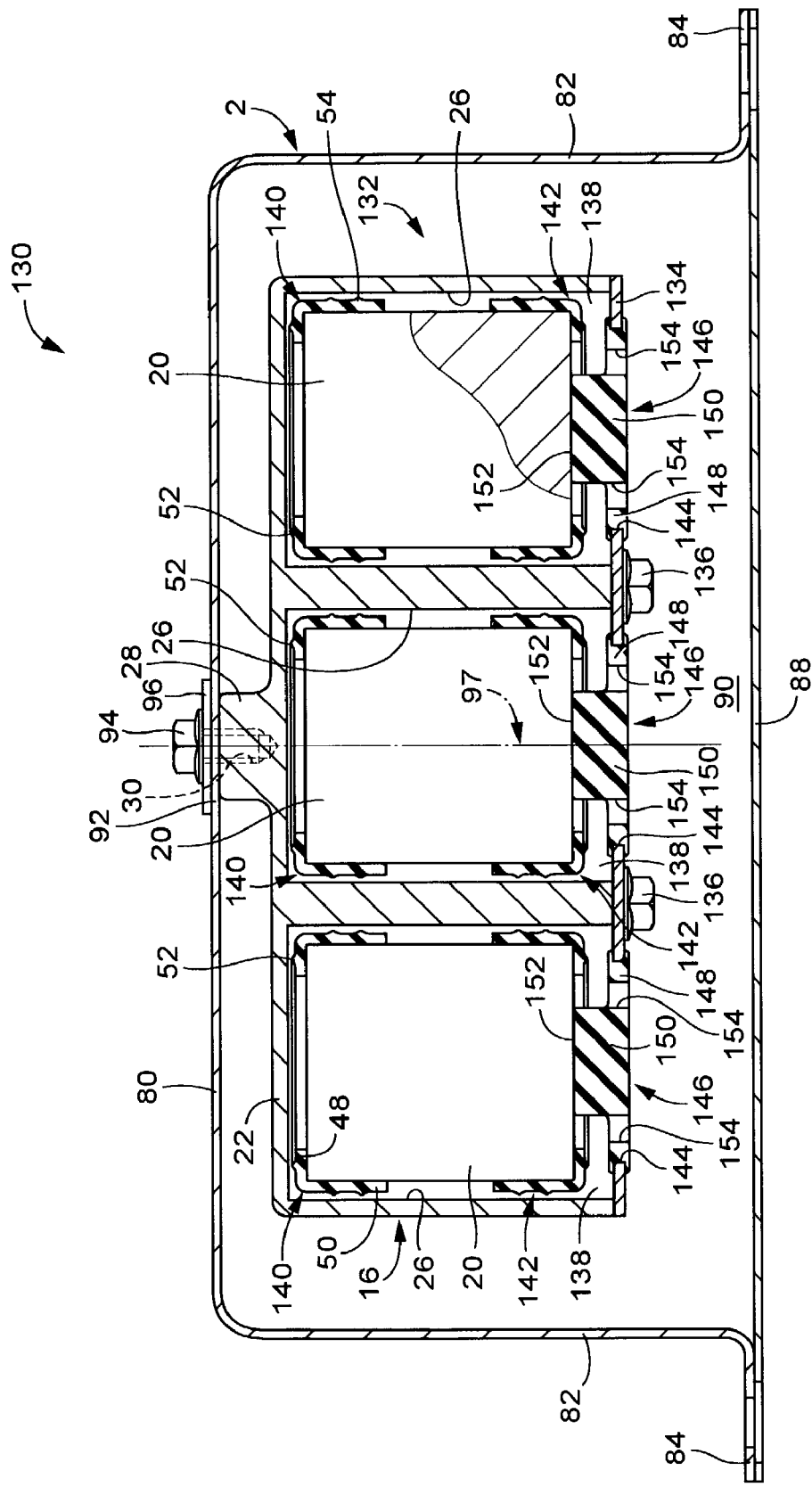
FIG. 7 is an elevational view in vertical or axial cross section of a vibration-damping device constructed according to a third embodiment of the invention.
Figure 8:
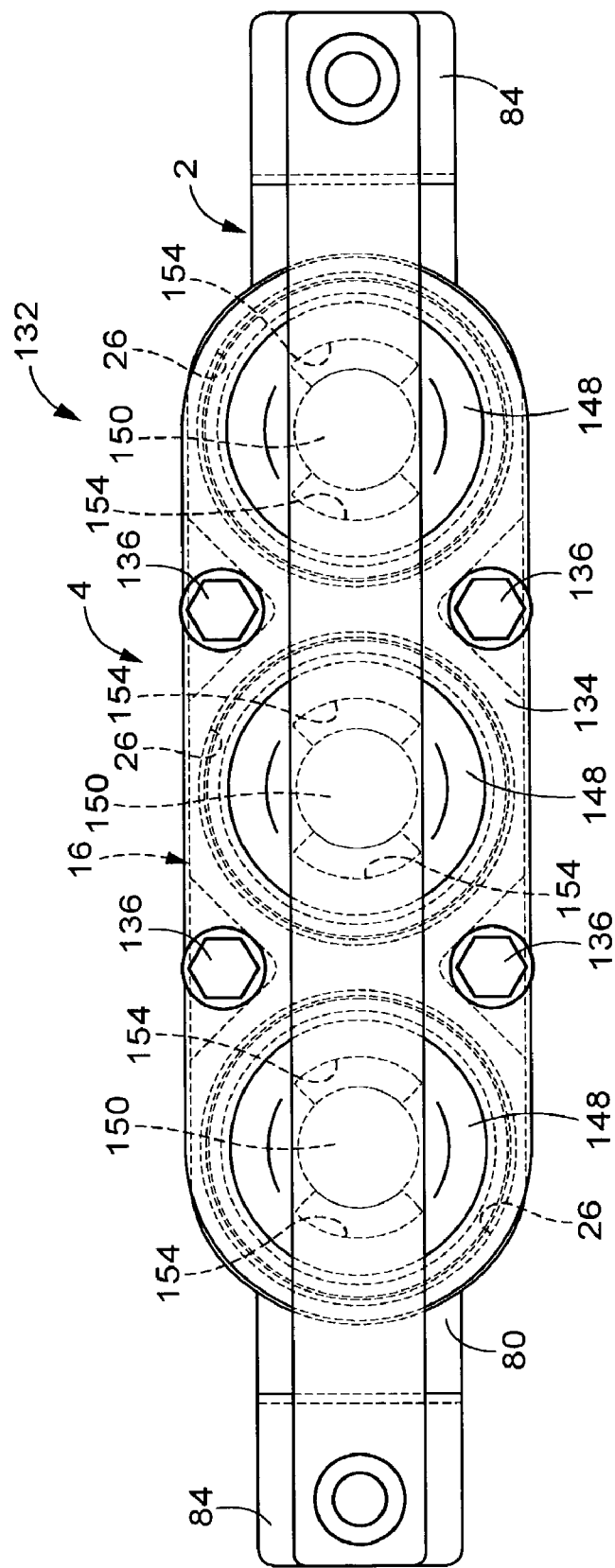
FIG. 8 is a bottom plane view of the vibration-damping device of FIG. 7.

Referring next to FIGS. 7–8, there is illustrated a vibration-damping device 130 constructed according to a third embodiment of the present invention, which is identical with the first embodiment, except the arrangement in the structure of the damper mass, more specifically, in an elastic member disposed between abutting portions of the mass members 20 and the hollow housing member 16. The same reference numerals as used in the first embodiment will be used in the third embodiment to identify the structurally and/or functionally corresponding elements, and no detailed description of these elements will be provided.

In the vibration-damping device 130, a damper mass 132 includes the housing body 22 and a lower lid 134. The housing body 22 is formed with the three recesses 26 open in its lower end face. The lower lid 134 is superposed on and bonded to the lower end face of the housing body 22 by means of a plurality of fixing bolts 136, whereby the openings of the three recesses 26 are closed by the lower lid 134, to thereby form three independent accommodation spaces 138

The thus formed three independent accommodation spaces 138 house three mass members 20, respectively. Like the first embodiment, each mass member 20 is a solid cylindrical block member made of metal, and is housed within the accommodation space 138 such that the mass member 20 is independent of and displaceable relative to the accommodation space 138 by a given amount. An upper cushioning cover 140 and a lower cushioning cover 142 are bonded to an axially upper and lower end portions of each mass member 20. The upper and lower cushioning covers 140, 142 are formed of a rubber elastic body, and are held in close contact with the upper and lower end portions of the mass member 20 while extending over a circumference of the mass member 20 with a constant "L" shape in cross section. Thus, axially upper and lower circumferential edge portions of the mass member 20 are entirely covered by the upper and lower cushioning covers 140, 142. That is, the upper and lower cushioning covers 140, 142, which are fixed to the upper and lower end portions of the mass member 20, are generally structurally identical with the upper cushioning cover 44 used in the first embodiment. In the present embodiment, namely, each mass member 20 is provided with no elastic member (no abutting portion) that is interposed between the mass member 20 and the housing member 16 to be subjected to shear deformation, when the mass member 20 comes into impact on the housing member 16. Like the first embodiment, these upper and lower cushioning covers 140, 142 may be bonded to the upper and lower end portions of each mass member 20 in the process of vulcanization of a rubber material for forming these covers 140, 142, or alternatively may be formed by vulcanization independently of the mass member 20, and are press-fitted onto the upper and lower end portions of the mass member 20, which may be subjected to an adhesive treatment, as needed.

Figure 9:
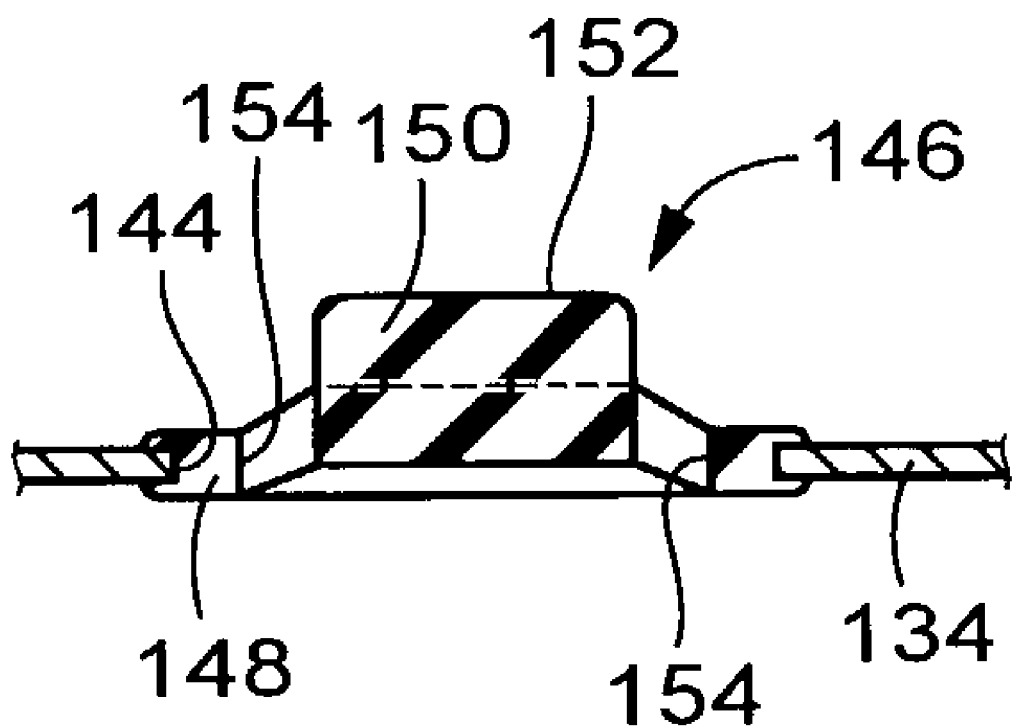
FIG. 9 is a vertical cross sectional view of an abutting rubber elastic body of the vibration-damping device of FIG. 7.

The lower lid 134 is formed of a flat-shaped metallic plate having a sufficient rigidity. The lower lid 134 includes three circular holes 144 formed through respective portions thereof, which are directly opposed to the opening of the three recesses 26, respectively in the vertical direction as seen in FIG. 7. Namely, each circular hole 144 is disposed in a coaxial relationship with the corresponding recess 26 with a given vertical spacing therebetween. Opening of these circular hole 144 formed through the lower lid 134 are closed by abutting rubber elastic bodies 146, respectively, which function as an elastic member in the form of a shear-type rubber elastic body. Described more specifically, each abutting rubber elastic body 146 has a disk-like shape in its entirety, and is bonded at its peripheral portion to an inner circumferential portion of the corresponding circular hole 144 in the process of vulcanization of a rubber material for forming the abutting rubber elastic body 146. As is apparent from FIG. 9, each abutting rubber elastic body 146 includes an elastic support part 148 and a central abutting part 150. In a static state of the abutting rubber elastic body 146 as shown in FIG. 9, the elastic support part 148 has an inverted dish-like shape or a tapered shape, and extends axially outwardly and radially inwardly from the inner peripheral portion of the circular hole 144 to the central abutting part 150. The central abutting part 150 has a thick-walled solid cylindrical block shape and protrudes axially upwardly such that an upper end face of the central abutting part 150 extends in a radial direction perpendicular to an axial direction of the corresponding circular hole 144. This upper end face of the central abutting part 150 serves as an abutting surface 152, which is adapted to be brought into abutting contact with the lower end face of the corresponding mass member 20. In order to adjust spring characteristics of the elastic support part 148, a pair of arc-shaped slits 154, 154 are formed at respective circumferential portions of the elastic support part 148, which portions are opposed to each other in a diametric direction of the abutting part 152 with the abutting part 152 interposed therebetween. Each of the slits 154, 154 extends circumferentially by a circumferential length that is approximately equal to a quarter of an entire circumference of the elastic support part 148.

According to the vibration-damping device 130 constructed as described above, when a vibrational load is applied to the vibration-damping device 130 in the vertical direction, the mass members 20 are forced to be displaced in the vertical direction relative to the housing member 16. As a result, the mass members 20 come into impact on the lower lid 134 of the hollow housing member 16 via the abutting rubber elastic body 146 that is subjected to shear deformation. Thus, the vibration-damping device 130 can exhibit an excellent damping effect based on the impact of the mass members 20 on the hollow housing member 16, like the first embodiment.

Meanwhile, the damper mass 132 may further includes a cover member for covering a lower end face of the lower lid 134, as needed. This arrangement can avoid undesirable entrance of the dust or other foreign substances into the accommodation spaces 138 through the slits 154 of the abutting rubber elastic bodies 146.

Figure 10:
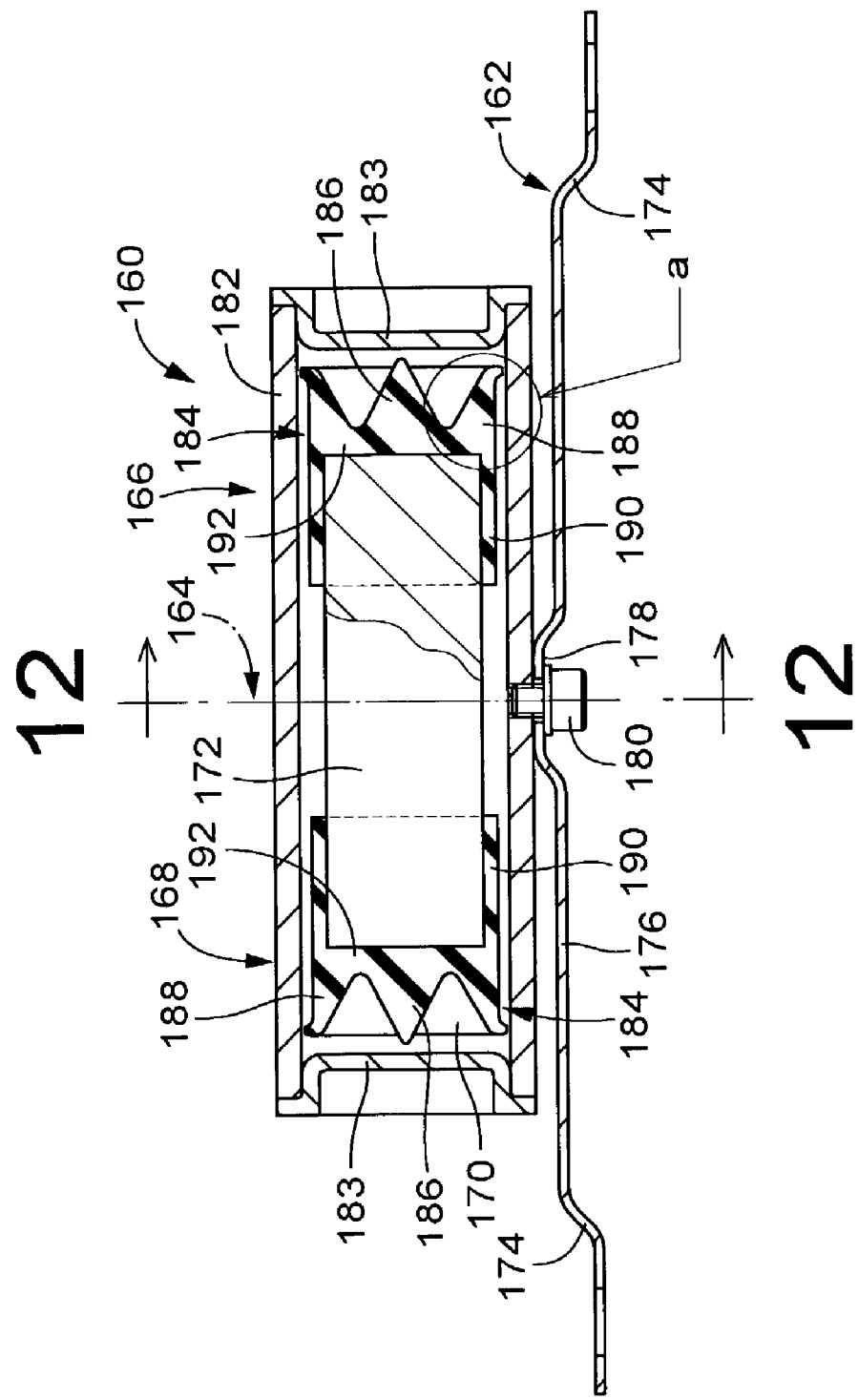
FIG. 10 is an elevational view in vertical or axial cross section of a vibration-damping device constructed according to a fourth embodiment of the invention.
Figure 11:
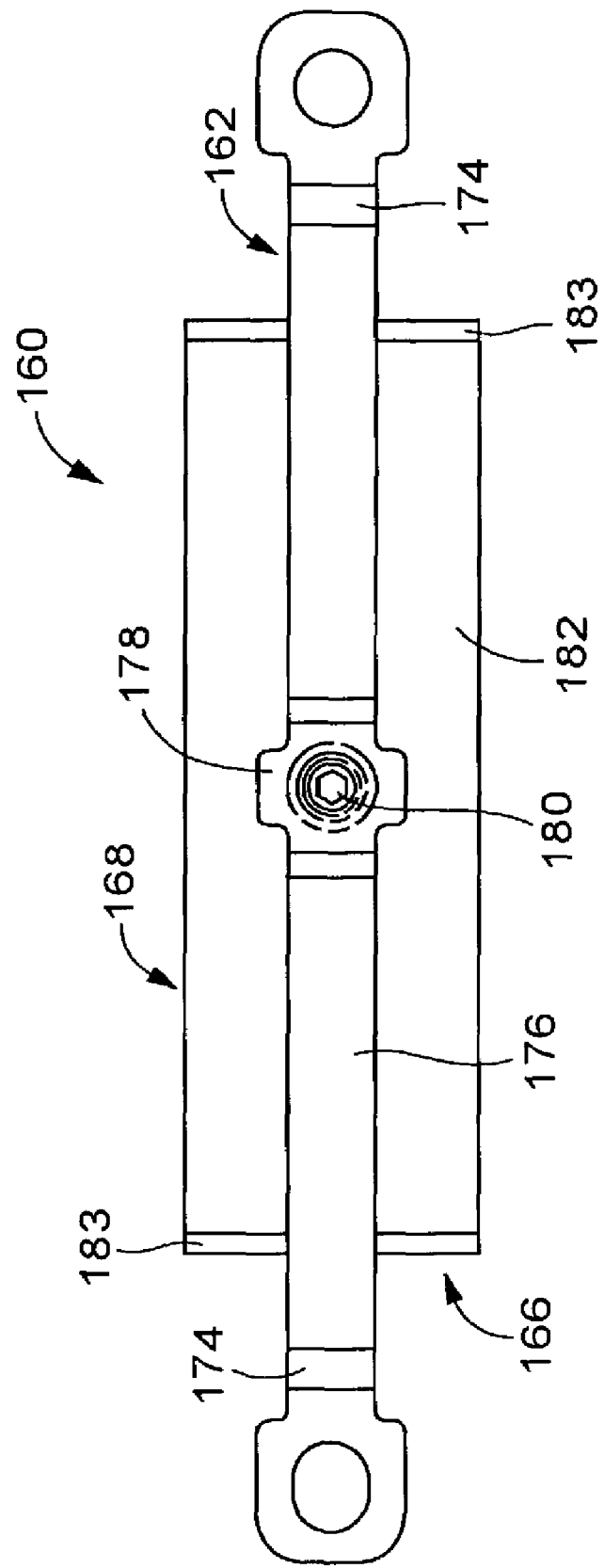
FIG. 11 is a bottom plane view of the vibration-damping device of FIG. 10.
Figure 12:
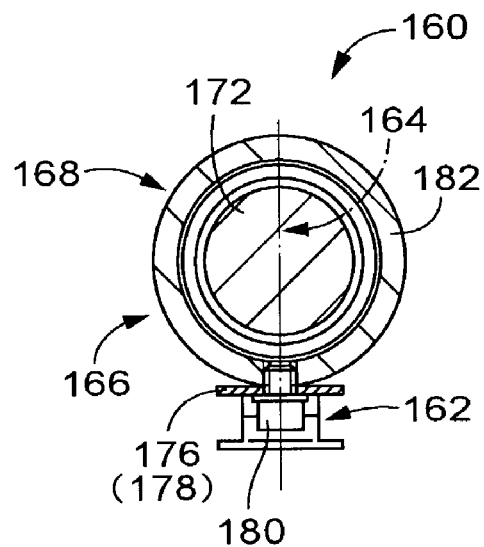
FIG. 12 is a cross sectional view taken along line 12—12 of FIG. 10.
Figure 13:
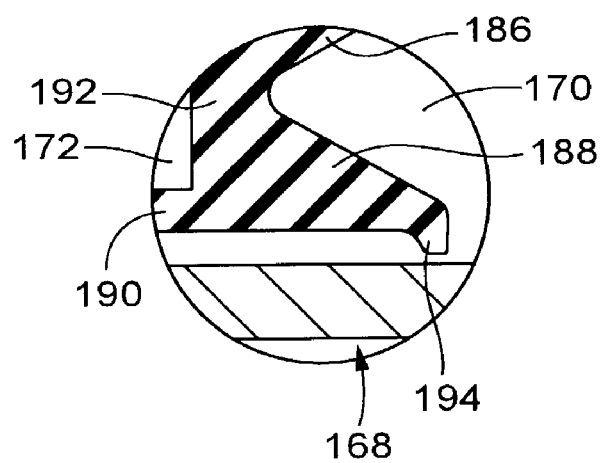
FIG. 13 is an enlarged view showing a part "a" of FIG. 10.

Referring next to FIGS. 10–12, there is illustrated a vibration-damping device 160 constructed according to a fourth embodiment of the present invention. The vibration-damping device 160 of the present embodiment includes a gate-shaped leaf spring 162 and a damper mass 166 that is fixed to the gate-shaped leaf spring 162 such that a central axis of the damper mass 166 is approximately aligned to an principal elastic axis 164 of the gate-shaped leaf spring 162. Like the aforementioned embodiments, the gate-shaped leaf spring 162 is adapted to be fixed to a vibrative member (not shown) so that the vibration-damping device 160 provides a secondary vibration system with respect to the vibrative member as a primary vibration system.

The damper mass 166 includes a hollow housing member 168 defining therein an accommodation space 170, and a mass member 172 housed in the accommodation space 170 such that the mass member 172 is independent of and displaceable relative to the hollow housing member 168, like the illustrated embodiments.

In the present embodiment, the gate-shaped leaf spring 162 includes a top plate portion 176 and a pair of leg portions 174, 174 extending downwardly from the longitudinally opposite end portions of the top plate portion 176. The length dimension of the leg portions 174, 174 is made smaller than that of the leg portions 82, 82 of the gate-shaped leaf spring 2 of the first embodiment. The top plate portion 176 of the leaf spring 162 has a central convex portion serving as a mass-fixing portion 178. The damper mass 166 is disposed on the top plate portion 176 of the gate-shaped leaf spring 162 with a central portion of the damper mass 166 being superposed on and bolted to the mass-fixing portion 178 through which the principal elastic axis 164 of the gate-shaped leaf spring 162 extends vertically. As a result, the center of gravity of the damper mass 166 is located approximately on the principal elastic axis 164 of the gate-shaped leaf spring 162.

The hollow housing member 168 consists of a metallic housing body 182 having a thick-walled hollow cylindrical shape and metallic disk-shaped lid members 183, 183, which are press-fitted into axially opposite openings of the housing body 182. The thus formed hollow housing member 168 is a hollow rigid member in its entirety. The hollow housing member 168 is disposed on the top plate 176 of the gate-shaped leaf spring 162 such that a central axis of the hollow housing member 168 is parallel to the longitudinal direction of the top plate portion 176, and is perpendicular to the principal elastic axis 164 of the gate-shaped leaf spring 162.

The mass member 172 is a solid circular rod member made of a high gravity metallic material such as steel, and has a profile corresponding to that of the inner surface of the housing body 168 with a size that is made some-what smaller than that of the inner surface of the housing body 168. A pair of cushioning covers 184, 184 are fixed to the axially opposite end portions of the mass member 172. Each cushioning cover 184 includes a cylindrical portion 190 adapted to be held in close contact with an outer circumferential surface of the corresponding end portion of the mass member 172, and a bottom wall portion 192 adapted to be disposed on and extend axially outwardly from the corresponding end face of the mass member 172. Each cushioning cover 184 is formed of a rubber elastic body in which the cylindrical portion 190 and the bottom wall portion 192 are integrally formed with each other. The thus formed cushioning covers 184, 184 are press-fitted onto the axially opposite end portions of the mass member 172, respectively. A suitable adhesive treatment may be performed on the mass member 172, as needed.

More specifically, each cushioning cover 184 includes a conical shaped central projection 186 integrally formed at a central portion of the bottom wall portion 192 so as to be disposed in a coaxial relationship with the bottom wall portion 192 and so as to extend axially outwardly from the bottom wall portion 192. With the mass member 172 disposed within the accommodation space 170, protruding end portions of the central projections 186 are opposed to inner surfaces of the lid members 183, 183 with a given axial spacing therebetween. In the present embodiment, an axial distance between tip ends of the central projections 186, 186 of the cushioning covers 184, 184 is made smaller by a dimension of 0.1–1.6 mm than an axial distance between the rid members 183, 183, so that the mass member 172 can be suitably positioned relative to the accommodation space 170 in the axial direction, and a center of gravity of the mass member 172 can be generally located on the principal elastic axis of the gate-shaped leaf spring 162.

Each cushioning cover 184 further includes an annular peripheral projection 188 integrally formed at a peripheral portion of the bottom wall portion 192 so as to extend circumferentially about the central projection 186 with a generally constant axial length that is made smaller than that of the central projection 186. An outer circumferential surface of the annular peripheral projection 188 is contiguous to the outer circumferential surface of the cylindrical portion 190 and extends straightly in the axial direction. An inner circumferential surface of the annular peripheral projection 188, on the other hand, extends axially outwardly and radially outwardly from the bottom wall portion 192. Thus, the peripheral projection 188 has a wall-thickness dimension that gradually decreases in the axially outward direction. The annular peripheral projection 188 is bent radially outwardly at its tip end portion to thereby form an integrally formed abutting projection 194, which extends continuously over its circumference, as is clearly apparent from a fragmentally enlarged view of FIG. 13. It should be noted that FIGS. 10–13 illustrate a gravity-free state where the mass member 172 and the hollow housing member 168 are disposed in a coaxial relationship with each other.

The abutting projection 194 of each cushioning cover 184 has an outer diameter that is made smaller than the inner diameter of the housing body 182 by a radial dimension of 0.1–1.6 mm, more preferably 0.1–1.0 mm, so as to permit the independent displacement of the mass member 172 within the accommodation space 170. An amount of projection of the abutting projections 194 from the outer circumferential surfaces of the annular peripheral projections 188 in the radial direction may be suitably determined with a spring constant of the peripheral projections 188 or the like taken into consideration so as to prevent any portions of the cushioning covers 184 other than the abutting projections 194 from being brought into abutting contact with the housing body 182 when the vibration-damping device 160 is subjected to vibrations of general level.

According to the vibration-damping device 160 constructed as described above, when a vibrational load is applied to the vibration-damping device 160 in the vertical direction, the mass member 172 is forced to be displaced in the vertical direction relative to the hollow housing member 168. As a result, the mass member 172 comes into elastic impact on the hollow housing member 168 via the abutting projections 194, 194, which are subjected to shear deformation as shear-type rubber elastic body. Thus, the vibration-damping device 160 can exhibit an excellent damping effect based on the impact of the mass member 172 on the hollow housing member 168, like the first embodiment.

While the present invention has been described in detail in its presently preferred embodiments, for illustrative purpose only, it is to be understood that the invention is by no means limited to the details of the illustrated embodiments, but may be otherwise embodied.

The hollow housing member and the mass members may have a variety of shapes, but not limited to those in the illustrated embodiments. For instance, the hollow housing member may be modified to have the accommodation space capable of housing two or not less than four mass members, or each mass member may be modified to have a diameter larger than its axial length, while taking into account a required damping characteristics or a given space for installing the vibration-damping device.

The elastic member interposed between the mass member and the hollow housing member when these members are brought into impact on each other, is not necessarily required to be primary subjected to shear deformation. The elastic member may possibly consist of an elastic member that is arranged to be subjected to compression deformation upon impact of the mass member on the housing member. For instance, a rubber elastic body layer bonded in close contact with an outer surface of the mass member or an inner surface of the hollow housing member may be employed as the elastic member.

The metallic spring member may have a variety of shapes, other than the gate-shaped employed in the illustrated embodiment. For instance, a flat-plate metallic spring can be used as the metallic spring member, if the vibrative member includes a recess open in its mounting surface, for thereby permitting elastic displacement of the flat-plate metallic spring. Alternatively, the metallic spring member may have not less than three legs extending in the respective outward directions from a portion to which the damper mass is fixed. In this case, the damper mass is elastically supported by the three or more legs of the metallic spring member on the vibrative member. This makes it possible to stably keep the direction of the displacement of the mass member in the direction of the principal elastic axis of the metallic spring member, resulting in stable displacement of the mass member.

The vibration-damping device constructed according to the present invention can also exhibit an excellent damping effect with respect to vibrations applied thereto in a horizontal direction, or various other inclined directions, other than the vertical direction, by simply orienting the principal elastic axis of the metallic spring member to a specific primary vibration input direction.

It should be appreciated that the vibration-damping device of the present invention is applicable to extremely wide fields, e.g., various kinds of vibrative members of an automotive vehicle, e.g., a body, a sub frame, an engine block, a sheet, members in a steering system, an instrumental panel, a door, a mirror, or other vibrative members other than vehicles.

It is also to be understood that the present invention may be embodied with various other changes, modifications and improvements, which may occur to those skilled in the art, without departing from the spirit and scope of the invention defined in the following claims.

What is claimed is:

1. A vibration-damping device for damping vibrations excited in a vibrative member, comprising:
   a damper mass including a housing member defining a hollow accommodation space therein, and an independent mass member including an elastic member attached thereto being housed within said accommodation space of said housing member with a slight spacing therebetween so that said independent mass member is independent of said housing member and is freely displaceable within said accommodation space of said housing member to come into impact on said housing member via said elastic member; and
   a metallic spring member adapted to be fixed at a plurality of fixing portions thereof on the vibrative member for elastically supporting said damper mass on the vibrative member, such that said housing member of said damper mass is fixed to a portion of said metallic spring member through which a principal elastic axis of said metallic spring member extends, and that a center of gravity of said damper mass is located approximately on said principal elastic axis of said metallic spring member, so that the metallic spring member elastically connects the housing member to the vibrative member.

2. A vibration-damping device device according to claim 1, wherein an entire center of gravity of said independent mass member entirely is located on said principal elastic axis of said metallic spring member.

3. A vibration-damping device according to claim 1, wherein said independent mass member comprises a pillar shaped mass disposed within said accommodation space such that a central axis of said pillar shaped mass extends approximately parallel to said principal elastic axis of said metallic spring member, and at least one of axially opposite end portions of said pillar shaped mass comes into impact on said housing member.

4. A vibration-damping device constructed according to claim 1, wherein said metallic spring member has a loss factor of not greater than 0.07.

5. A vibration-damping device according to claim 1, wherein a total mass of said damper mass is held within a range of 5–15% of a mass of the vibrative member.

6. A vibration-damping device according to claim 1, wherein said elastic member has a Shore D hardness of not gmater than 80 as measured in accordance with ASTM method D-2240.

7. A vibration-damping device according to claim 1, wherein said independent mass member is able to travel by a distance of 0.1–1.6 mm in a radial direction perpendicular to said principal elastic axis of said metallic spring member between abutting portions of an inner surface of said housing member, which are opposed to each other in said radial direction with said independent mass member interposed therebetween.

8. A vibration-damping device according to claim 1, wherein said accommodation space defined within said housing member is fluid-tightly closed from an external area.

9. A vibration-damping device according to claim 1, wherein said independent mass member has a mass within a range of 10–1000 g.

10. A vibration-damping device according to claim 1, wherein said independent mass member is able to travel by a distance of not less than 1.0 mm in a direction parallel to said principal elastic axis of said metallic spring member between abutting portions of an inner surface of said housing member, which are opposed to each other in said direction parallel to said principal elastic axis of said metallic spring member.

11. The vibration damping device according to claim 1, wherein an entire outer peripheral surface of said independent mass member including said elastic member attached thereto has a smaller diameter than an inner diameter of said housing member so that the independent mass member and elastic member may be entirely spaced away from said housing member.

12. A vibration-damping device for damping vibrations excited in a vibrative member, comprising:
   a damper mass including a housing member defining an accommodation space therein, an independent mass member housed within said accommodation space of said housing member with a slight spacing therebetween so that said independent mass member is independent of said housing member and is freely displaceable within said accommodation space of said housing member to come into impact on said housing member via an elastic member; and a metallic spring member adapted to be fixed at a plurality of fixing portions thereof on the vibrative member for elastically supporting said damper mass on the vibrative member, such that said housing member of said damper mass is fixed to a portion of said metallic spring member through which a principal elastic axis of said metallic spring member extends, and that a center of gravity of said damper mass is located approximately on said principal elastic axis of said metallic spring member, wherein said elastic member comprises a shear type rubber elastic body that is subjected to shear deformation when said independent mass member comes into impact on said housing member via said shear-type rubber elastic body.

13. A vibration-damping device for damping vibrations excited in a vibrative member, comprising:

a damper mass including a housing member defining an accommodation space therein, an independent mass member housed within said accommodation space of said housing member with a slight spacing therebetween so that said independent mass member is independent of said housing member and is freely displaceable within said accommodation space of said housing member to come into impact on said housing member via an elastic member; and a metallic spring member adapted to be fixed at a plurality of fixing portions thereof on the vibrative member for elastically supporting said damper mass on the vibrative member, such that said housing member of said damper mass is fixed to a portion of said metallic spring member through which a principal elastic axis of said metallic spring member extends, and that a center of gravity of said damper mass is located approximately on said principal elastic axis of said metallic spring member, wherein said metallic spring member comprises a gate-shaped leaf spring made out of a leaf spring by bending longitudinally opposite end portions of said leaf spring to form a pair of leg portions integrally formed at longitudinally opposite ends of a top plate portion interposed therebetween, and said gate-shaped leaf spring is adapted to be fixed on the vibrative member at distal end portions of said pair of leg portions, and supports said damper mass whose housing member is fixed to an approximately central portion of said top plate portion.

14. A vibration-damping device according to claim 13, further comprising a connecting plate by which said distal end portions of said pair of leg portions of said gate-shaped leaf spring are connected wit each other.

15. A vibration-damping device according to claim 13, further comprising a stop mechanism for limiting an amount of displacement of said damper mass relative to the vibrative member, said stop mechanism being provided between a portion of a distal-end-side half of each of said pair of leg portions and a corresponding portion of said housing member of said damper mass, and including a stopper projection formed at one of said portion of said distal-end-side half of each of said pair of leg portions and said corresponding portion of said housing member, and a stopper hole formed at an other one of said portion of said distal-end-side half of each of said pair of leg portions and said corresponding portion of said housing member, and said stopper projection protrudes toward and extends through said stopper hole with a spacing therebetween.

16. A vibration-damping device according to claim 15, wherein said stopper projection comprises a stopper bolt screwed into said corresponding portion of said housing member, and said stopper hole comprises a through hole formed at said portion of said distal-end-side half of each of said pair of leg portions and an abutting tube integrally formed at a peripheral portion of said through hole so as to protrude from at least one of opposite surfaces of said each of said pair of leg portions.

* * * * *